(12) United States Patent
Lee et al.

(10) Patent No.: US 11,797,128 B2
(45) Date of Patent: Oct. 24, 2023

(54) TOUCH SENSING CIRCUIT INCLUDING ADJUSTABLE FILTER AND TOUCH SENSING METHOD THEREOF

(71) Applicant: LX Semicon Co., Ltd., Daejeon (KR)

(72) Inventors: Kyu Tae Lee, Daejeon (KR); Mun Seok Kang, Daejeon (KR); Jae Hwan Lee, Daejeon (KR); Jeong Kwon Nam, Daejeon (KR); Hyun Soo Chung, Daejeon (KR); Jin Yoon Jang, Daejeon (KR); Hee Ra Yun, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/738,659

(22) Filed: May 6, 2022

(65) Prior Publication Data

US 2022/0365654 A1    Nov. 17, 2022

(30) Foreign Application Priority Data

May 6, 2021    (KR) ........................ 10-2021-0058279

(51) Int. Cl.
*G06F 3/041*    (2006.01)
(52) U.S. Cl.
CPC ................................. *G06F 3/04182* (2019.05)
(58) Field of Classification Search
CPC ......... G06F 3/04182; G06F 3/041–047; G06F 2203/041–04114; G06F 3/03545; G06F 3/044; G06F 3/0412; G06F 3/0446; G06F 3/04883; G06F 3/016; G06F 2203/04104; G06F 3/04184; G06F 2203/04106; H01L 27/323

See application file for complete search history.

(56) References Cited

U.S. PATENT DOCUMENTS

| | | | | |
|---|---|---|---|---|
| 2015/0062081 A1* | 3/2015 | Lee | ........................ | G06F 3/0446 345/174 |
| 2016/0132147 A1* | 5/2016 | Lim | ..................... | G06F 3/04182 345/174 |

(Continued)

FOREIGN PATENT DOCUMENTS

| CN | 102591534 A * | 7/2012 | ........... G06F 3/0418 |
|---|---|---|---|
| KR | 20190009892 A | 1/2019 | |

(Continued)

*Primary Examiner* — Sanjiv D. Patel
(74) *Attorney, Agent, or Firm* — POLSINELLI PC

(57) ABSTRACT

The present embodiment may provide a touch sensing circuit including: an analog signal processing circuit including one or more adjustable filters configured to receive a touch sensing signal from a touch electrode of a panel and to transmit some of a frequency region of the touch sensing signal; and a touch control circuit configured to determine a change in capacitance of the touch electrode attributable to an object approaching the panel and to transmit a controlling signal to control the adjustable filters of the analog signal processing circuit. The adjustable filter of the present embodiment may include a variable resistor or a variable capacitor. A resistance value or capacitance value of the adjustable filter may be changed in response to the controlling signal, thus changing a frequency pass band of the touch sensing signal.

19 Claims, 19 Drawing Sheets

(56) References Cited

U.S. PATENT DOCUMENTS

| | | | |
|---|---|---|---|
| 2016/0253033 A1* | 9/2016 | Omelchuk | G06F 3/0442 |
| | | | 345/174 |
| 2017/0017348 A1* | 1/2017 | Ahn | G06F 3/0446 |
| 2019/0102034 A1* | 4/2019 | Nam | G06F 3/04182 |
| 2019/0171320 A1* | 6/2019 | Kim | G06F 3/0443 |
| 2019/0196642 A1* | 6/2019 | Kong | G06F 3/041662 |

FOREIGN PATENT DOCUMENTS

| | | | |
|---|---|---|---|
| KR | 20190079369 A | 7/2019 | |
| KR | 20210010277 A | 1/2021 | |
| WO | WO-2021206264 A1 * | 10/2021 | G06F 3/03545 |

\* cited by examiner

TOUCH SENSING CIRCUIT INCLUDING ADJUSTABLE FILTER AND TOUCH SENSING METHOD THEREOF

CROSS REFERENCE TO RELATED APPLICATION

This application claims priority from Republic of Korea Patent Application No. 10-2021-0058279 filed on May 6, 2021, which is hereby incorporated by reference in its entirety.

BACKGROUND

1. Field of Technology

The embodiment relates to a touch sensing circuit capable of sensing the touch of an object, and particularly, to a touch sensing circuit including an adjustable filter, a touch panel including the touch sensing circuit, and a touch sensing method of a display device.

2. Description of the Prior Art

A technology for recognizing an external object that approaches or touches a touch panel is called a touch sensing technology. The touch panel is placed at the same location as a display panel on a plane. Accordingly, a user may input a user manipulation signal to the touch panel while watching an image on the display panel. Such a method of generating a user manipulation signal provides excellent user intuition compared to the existing user manipulation signal input method, for example, a mouse input method or a keyboard input method.

According to such an advantage, the touch sensing technology is being applied to various electronic devices including display panels. A touch sensing circuit may sense the touch or approach of an external object for a touch panel by supplying a driving signal to a driving electrode disposed in the touch panel and receiving a response signal formed in a sensing electrode. The touch panel generates capacitance between the driving electrode and the sensing electrode. A change in the capacitance may indicate a touch or approach of the external object.

A frequency of a sensing signal generated based on the touch or approach of an object is also determined based on a frequency of a driving signal supplied to a driving electrode of a touch panel. Accordingly, more accurate touch sensing may be performed by differently setting a frequency of a signal received in each sensing line of the touch panel depending on the type of object.

An analog signal processing circuit within a touch sensing circuit is designed to recognize one touch frequency. Accordingly, in order to sense a plurality of frequency signals by a plurality of objects, an analog signal processing circuit corresponding to each frequency is required. A total number or size of analog signal processing circuits is increased as the type of recognizable object is increased.

Furthermore, the analog signal processing circuit within the touch sensing circuit is not driven in association with a digital signal processing circuit depending on a change in a driving mode of the digital signal processing circuit. Accordingly, there is a problem in that an individual analog signal processing circuit is used depending on a signal processing method of the digital signal processing circuit.

As various manufacturers recently provide stylus pens, a frequency of a signal is differently set for each protocol of a product. Accordingly, in order to design an analog signal processing circuit having versatility, the size of a touch sensing circuit is increased and a reduction in the size of a display device is made difficult.

SUMMARY OF THE INVENTION

Under such a background, various embodiments are directed to providing a touch sensing technology capable of reducing the size of a display device and power consumption by integrating analog signal processing circuits in the readout circuit of a touch sensing circuit and simultaneously sensing a stylus pen and a finger in a digital signal processing circuit.

Under such a background, various embodiments are directed to providing a touch sensing technology capable of sensing objects having different frequencies, reducing the size of a display device, and reducing power consumption by providing an analog signal processing circuit including an adjustable filter.

In an aspect, the present embodiment may provide a touch sensing circuit including: an analog signal processing circuit including one or more adjustable filters configured to receive a touch sensing signal from a touch electrode of a panel and to transmit some of a frequency region of the touch sensing signal; and a touch control circuit configured to determine a change in capacitance of the touch electrode attributable to an object approaching the panel and to transmit a controlling signal to control the adjustable filters of the analog signal processing circuit. The adjustable filter may include a variable resistor or a variable capacitor. A resistance value or capacitance value of the adjustable filter may be changed in response to the controlling signal, thus changing a frequency pass band of the touch sensing signal.

In another aspect, the present embodiment may provide a touch and display driving integrated circuit (IC) including: an analog signal processing circuit including one or more filters configured to receive a touch sensing signal from a touch electrode in a touch driving period among periods time-divided into a display driving period and the touch driving period and to remove noise of the touch sensing signal; and a digital signal processing circuit configured to convert a signal received from the analog signal processing circuit into a digital signal. The filter may include an adjustable filter having a frequency pass band changed depending on the type of touch sensing signal.

In still another aspect, the present embodiment may provide a touch sensing method including: determining the type of object by receiving a touch sensing signal sensed in a touch electrode of a panel; checking set values of a variable resistance or variable capacitance of an adjustable filter within a touch sensing circuit based on the type of object; and changing a frequency pass band of the touch sensing signal passing through the adjustable filter based on the set values.

An embodiment of the present disclosure can reduce the size of a display device and power consumption by providing the touch sensing technology for integrating analog signal processing circuits in the readout circuit of a touch sensing circuit and simultaneously sensing a stylus pen and a finger in a digital signal processing circuit.

An embodiment of the present disclosure can sense objects having different frequencies, can reduce the size of a display device, and can reduce power consumption by providing the analog signal processing circuit including the adjustable filter.

DETAILED DESCRIPTION OF THE EXEMPLARY EMBODIMENTS

Figure 1:
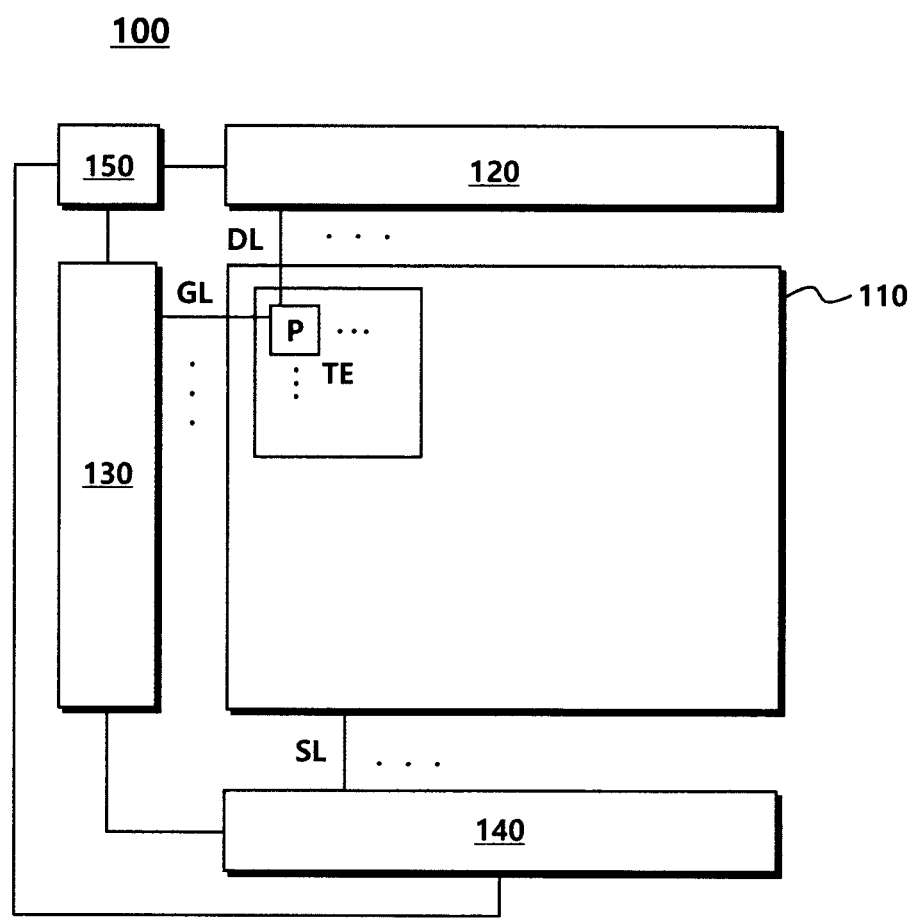
FIG. 1 is a configuration diagram of a display device according to an embodiment.

FIG. 1 is a configuration diagram of a display device according to an embodiment.

Referring to FIG. 1, a display device 100 may include a panel 110, a data driving circuit 120, a gate driving circuit 130, a touch sensing circuit 140, a control circuit 150, etc.

A plurality of data lines DL connected to the data driving circuit 120 may be formed in the panel 110. A plurality of gate lines GL connected to the gate driving circuit 130 may be formed in the panel 110. Furthermore, multiple pixels P corresponding to intersections among the plurality of data lines DL and the plurality of gate lines GL may be defined in the panel 110.

A transistor having a first electrode (e.g., a source electrode or a drain electrode) connected to the data line DL, a gate electrode connected to the gate line GL, and a second electrode (e.g., a drain electrode or a source electrode) connected to a display electrode may be formed in each pixel P.

Furthermore, a plurality of touch electrodes TE may be isolated from one another and further formed in the panel 110. One pixel P or multiple pixels P may be placed in an area where the touch electrode TE is placed.

The panel 110 may include a display panel and a touch panel (or a touch screen panel (TSP)). In this case, the display panel and the touch panel may share some elements. For example, the plurality of touch electrodes TE may be one element (e.g., a common electrode for applying a common voltage) of the display panel and may also be one element (e.g., a touch electrode for sensing a touch) of the touch panel. Such a panel 110 is called an integrated panel in that some elements of the display panel and the touch panel are shared, but the present disclosure is not limited thereto. Furthermore, as a form in which some elements of the display panel and the touch panel are shared, an in-cell type panel is known. The in-cell type panel is merely an example of the panel 110, and a panel to which the present disclosure is applied is not limited to such an in-cell type panel.

The data driving circuit 120 supplies a data signal to the data line DL in order to display an image in each pixel P of the panel 110.

The data driving circuit 120 may include at least one data driver integrated circuit (IC). The at least one data driver IC may be connected to a bonding pad of the panel 110 by using a tape automated bonding (TAB) method or a chip on glass (COG) method or may be directly formed in the panel 110. In some cases, the at least one data driver IC may be integrated and formed in the panel 110. Furthermore, the data driving circuit 120 may be implemented using a chip on film (COF) method.

The gate driving circuit 130 sequentially supplies a scan signal to the gate line GL in order to turn on or off a transistor placed at each pixel P.

The gate driving circuit 130 may be placed on only one side of the panel 110 as illustrated in this drawing or may be divided into two and placed on both sides of the panel 110 depending on a driving method.

Furthermore, the gate driving circuit 130 may include at least one gate driver IC. The at least one gate driver IC may be connected to a bonding pad of the panel 110 by using the TAB method or the COG method or may be implemented as a gate in panel (GIP) type and directly formed in the panel 110. In some cases, the at least one gate driver IC may be integrated and formed in the panel 110. Furthermore, the gate driving circuit 130 may also be implemented using the COF method.

The touch sensing circuit 140 applies a driving signal to some or all of the plurality of touch electrodes TE connected to the sensing line SL.

As illustrated in this drawing, the touch sensing circuit 140 is an element separated from the data driving circuit 120 and the gate driving circuit 130. The touch sensing circuit 140 may be disposed outside the data driving circuit 120 and the gate driving circuit 130, but may be implemented as an internal element of another separate driver IC including at least one of the data driving circuit 120 and the gate driving circuit 130 or may be implemented as an internal element of the data driving circuit 120 or the gate driving circuit 130 depending on an implementation method. The touch sensing circuit 140 may be defined as a touch and driver driving IC (TDDI) or a touch and display driving IC (TDDI).

The touch and display driving IC (TDDI) can reduce the size of a circuit because one electrode can be time-divided and driven depending on a display driving period and a touch driving period. An electrode used in the touch and driver driving IC may be defined as a common electrode or a touch electrode.

If the data driving circuit 120 and the touch sensing circuit 140 form an integrated touch and driver driving IC (TDDI), image data may be obtained by blocking several common electrodes to which a common voltage is applied during a display driving period for image display. Touch data may be obtained by using the several blocked common electrodes as multiple touch electrodes TE.

Accordingly, when the touch sensing circuit 140 applies a driving signal to some or all of the plurality of touch electrodes TE, it may indicate that a separate driver IC including the touch sensing circuit 140 applies a driving signal to some or all of the plurality of touch electrodes TE. Furthermore, depending on a design method, when the touch sensing circuit 140 applies a driving signal to some or all of the plurality of touch electrodes TE, it may indicate that the data driving circuit 120 or the gate driving circuit 130 including the touch sensing circuit 140 applies a driving signal to some or all of the plurality of touch electrodes TE.

The implementation and design method of the touch sensing circuit 140 is not limited, and the touch sensing circuit 140 may be another element itself or an element disposed inside or outside another element if only an execution function of the other element or element is the same as or similar to that described in this specification.

Furthermore, FIG. 1 illustrates that one touch sensing circuit 140 is disposed in the display device 100, but the display device 100 may include two or more touch sensing circuits 140.

In order for the touch sensing circuit 140 to apply a driving signal to some or all of the plurality of touch electrodes TE, sensing lines SL are required to be connected to the plurality of touch electrodes TE, respectively. Accordingly, the sensing lines SL connected to the plurality of touch electrodes TE, respectively, and transferring driving signals may be formed in the panel 110 in a first direction (e.g., a longitudinal direction) or a second direction (e.g., a transverse direction).

The display device 100 may adopt a capacitive touch method of recognizing the approach or touch of an object by sensing a change in capacitance through the touch electrode TE.

Such a capacitive touch method may be divided into a mutual capacitance touch method and a self-capacitance touch method, for example.

In the mutual capacitance touch method, that is, a kind of capacitive touch method, a driving signal is applied to one touch electrode (Tx electrode), and another touch electrode (Rx electrode) coupled to the Tx electrode is sensed. In the mutual capacitance touch method, a value sensed in the Rx electrode is different depending on the approach or touch of an object, such as a finger or a pen. In the mutual capacitance touch method, whether a touch is present, touch coordinates, etc. are detected using a sensing value in the Rx electrode.

In the self-capacitance touch method, that is, another kind of capacitive touch method, after a driving signal is applied to one touch electrode TE, the corresponding one touch electrode TE is sensed again. In the self-capacitance touch method, a value sensed in the corresponding one touch electrode TE is different depending on the approach or touch of an object, such as a finger or a pen. In the self-capacitance touch method, whether a touch is present, touch coordinates, etc. are detected using such a sensing value. In the self-capacitance touch method, a Tx electrode and an Rx electrode are not distinguished because a touch electrode TE to which a driving signal is applied and a sensed touch electrode TE are the same.

The display device 100 may adopt one of the aforementioned two capacitive touch methods (i.e., the mutual capacitance touch method and the self-capacitance touch method). However, in this specification, an embodiment is described on the assumption that the self-capacitance touch method has been adopted, for convenience of description.

The display device 100 may drive the touch electrode TE by distinguishing between a section thereof into a display section and a touch section. For example, the touch sensing circuit 140 of the display device 100 may not apply a driving signal to some or all of the touch electrodes TE in a section in which the data signal is supplied.

Furthermore, the display device 100 may drive the touch electrode TE without distinguishing between the display section and the touch section. For example, the touch sensing circuit 140 of the display device 100 may apply a driving signal to some or all of the touch electrodes TE in a section in which the data signal is supplied.

The control circuit 150 may supply various controlling signals to the data driving circuit 120, the gate driving circuit 130 and the touch sensing circuit 140. The control circuit 150 may transmit a data control signal DCS that controls the data driving circuit 120 to supply a data voltage to each pixel P based on each timing, may transmit a gate control signal GCS to the gate driving circuit 130, and may transmit a sensing signal to the touch sensing circuit 140. The control circuit 150 may be a timing controller T-Con or may include the timing controller and further perform another control function.

Figure 2:
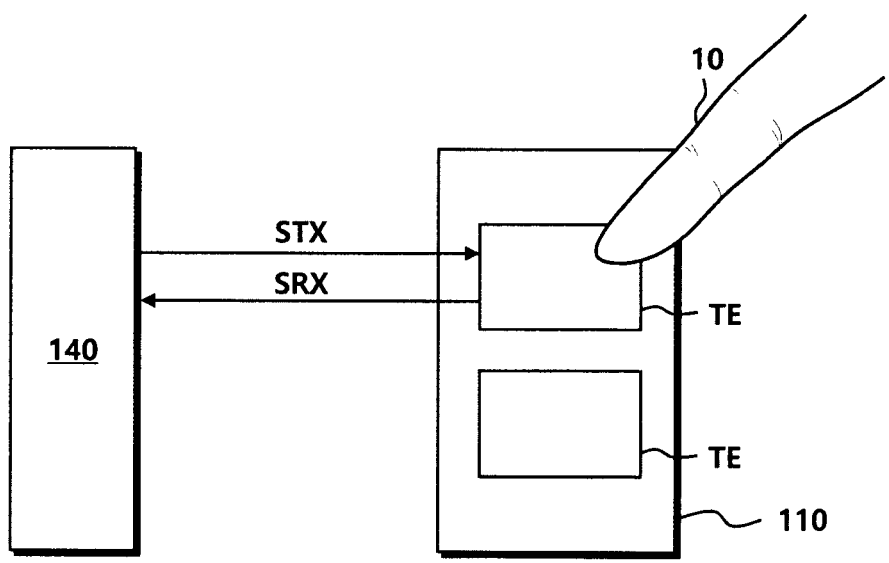
FIG. 2 is a diagram for describing a touch sensing process according to an embodiment.

FIG. 2 is a diagram for describing a touch sensing process according to an embodiment.

Referring to FIG. 2, a touch sensing system 200 may include the panel 110 and the touch sensing circuit 140.

A plurality of touch electrodes TE may be disposed in the panel 110.

The touch sensing circuit 140 may supply a driving signal STX to the touch electrode TE. The driving signal STX may be a signal having a voltage or current form. The driving signal STX having a voltage form may be defined as a driving voltage. The driving signal may include one driving cycle composed of a first period and a second period.

The touch sensing circuit 140 may receive a response signal SRX for the driving signal STX from the touch electrode TE, and may sense the touch or approach of an object 10 for the panel 110 by demodulating the response signal SRX. The response signal SRX may be a signal having a current or voltage form.

Figure 3:
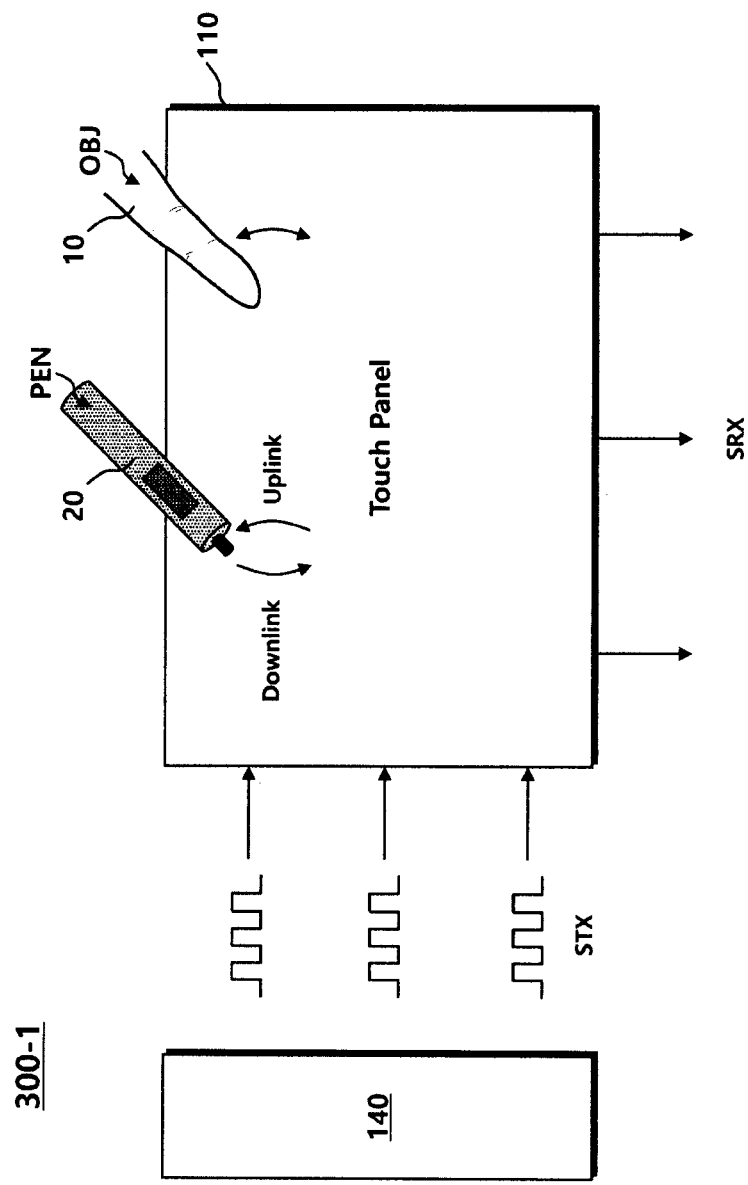
FIG. 3 is a diagram for describing a process of sensing touches of a stylus pen and a finger according to an embodiment.

FIG. 3 is a diagram for describing a process of sensing touches of a stylus pen and a finger according to an embodiment.

Referring to FIG. 3, in a touch sensing system 300-1, the display device 100, the touch panel 110, or the touch sensing circuit 140 may transmit an uplink signal UL to an object, for example, a stylus pen or a finger.

A driving circuit (not illustrated) of the touch sensing circuit 140 may transmit the uplink signal UL to a stylus pen 20 through a touch electrode. When the stylus pen 20 touches the panel 110 including the touch electrode or approaches the panel 110 within a given distance, the stylus pen 20 may receive the uplink signal UL. The uplink signal UL may be transmitted from a part of the panel 110 or the entire panel 110 to the stylus pen 20.

The uplink signal UL transmitted from the touch sensing circuit 140 to the stylus pen 20 may include information about the touch panel (e.g., state information of the touch panel, identification information of the touch panel or type information of the touch panel), information about a driving mode of the touch panel (e.g., identification information of a stylus pen search mode or a stylus pen driving mode), characteristic information of a stylus pen signal (e.g., a driving frequency of the touch panel, a transmission frequency of the stylus pen or the number of pulses of a signal), etc.

A sensing circuit (not illustrated) of the touch sensing circuit 140 may receive a downlink signal DL from the stylus pen 20 through a touch electrode. When receiving an uplink signal UL, the stylus pen 20 may transmit the downlink signal DL. The downlink signal DL may be transmitted to the touch electrode located at a point that is touched by the stylus pen or that the stylus pen approaches.

When receiving the downlink signal DL, the touch sensing circuit 140 may continuously exchange data with the stylus pen 20. If the downlink signal DL is not received from any timing, the touch sensing circuit 140 may search for an active pen again. That is, the touch sensing circuit 140 may repeat the above process by transmitting an uplink signal UL to the stylus pen again.

The touch sensing circuit 140 may determine whether a touch is present, a touch location, touch intensity, a touch interval, etc. based on a change in capacitance of a touch electrode according to the touch or approach of an object.

Furthermore, the touch sensing circuit 140 may receive a downlink signal DL generated by the stylus pen 20 itself, regardless of information based on the touch or approach of an object.

The downlink signal DL may include information about a state of the stylus pen (e.g., the state of the stylus pen may include power information of the stylus pen, frequency information of the stylus pen, protocol information of the stylus pen, a moving speed, a location, tilt information of the stylus pen, etc.).

The downlink signal DL transmitted by the stylus pen 20 may have a frequency different from a frequency of a driving signal. A processor (not illustrated) within the stylus pen 20 or a frequency selection circuit (not illustrated) may adopt the frequency of the downlink signal DL by taking into consideration information about a state of the stylus pen 20.

The touch sensing circuit 140 may distinguish between a signal generated due to a change in capacitance of a touch electrode attributable to an object that approaches the panel and a signal generated by a downlink signal transmitted by the object that approaches the panel.

Figure 4:
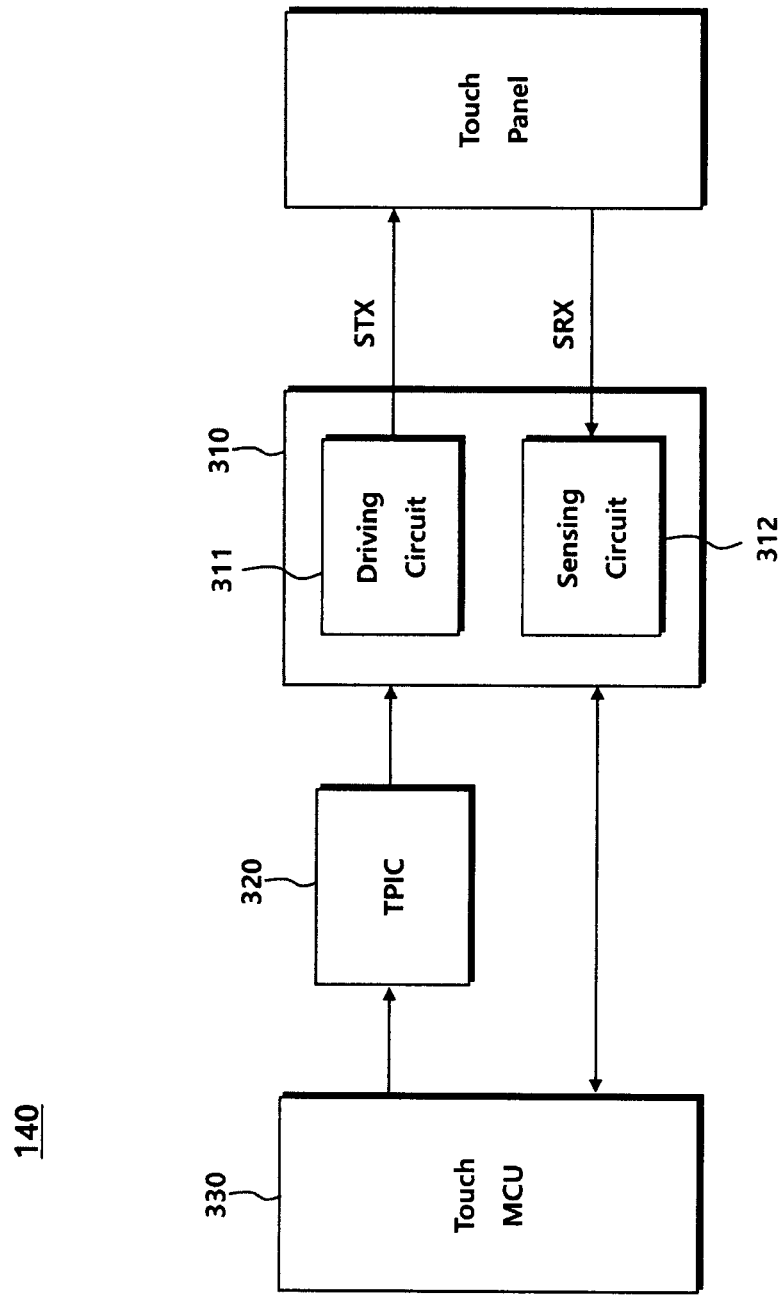
FIG. 4 is a configuration diagram of a touch sensing circuit according to an embodiment.

FIG. 4 is a configuration diagram of a touch sensing circuit according to an embodiment.

Referring to FIG. 4, the touch sensing circuit 140 may include a readout circuit 310, a touch power circuit 320, a touch control circuit 330, etc.

The readout circuit 310 may supply a touch electrode with a driving signal STX having given amplitude, for example, a driving voltage. A driving circuit 311 included in the readout circuit 310 may transmit the driving signal STX having changed amplitude, which is received from the touch control circuit 330. Furthermore, a sensing circuit 312 included in the readout circuit 310 may sense the touch or approach of an external object for the panel by receiving a response signal SRX for the driving signal STX from the touch electrode. The sensing circuit 312 may generate touch sensing data, for example, a touch sensing value by demodulating the response signal SRX.

Each of the driving signal STX and response signal SRX of the readout circuit 310 may be a square wave signal and may be a sine wave signal.

The touch power circuit 320 may generate various power signals, including a reference voltage signal and a driving voltage necessary to drive the panel 110, and may supply the various power signals to the readout circuit 310, the touch control circuit 330, etc. The touch power circuit 320 may be defined as a touch power integrated circuit (TPIC), if necessary.

The touch control circuit 330 may generate a controlling signal CS in order to control the readout circuit 310 and the touch power circuit 320. When the touch control circuit 330 transmits the controlling signal CS to the readout circuit 310 and the touch power circuit 320, the driving circuit 311 and the sensing circuit 312 may operate in response to the controlling signal CS. The touch control circuit 330 may be defined as a touch micro controller unit (MCU), if necessary.

The touch control circuit 330 may transmit, to the readout circuit 310, a controlling signal to control an analog signal processing circuit (or an analog front-end (AFE)) or a digital signal processing circuit (or a digital front-end (DFE)).

Figure 5:
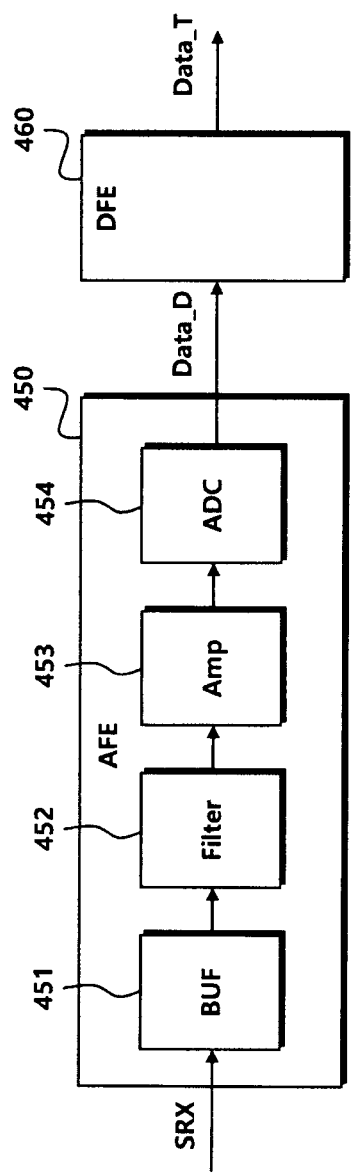
FIG. 5 is a configuration diagram of a readout circuit according to an embodiment.

FIG. 5 is a configuration diagram of a readout circuit according to an embodiment.

Referring to FIG. 5, the sensing circuit 312 of the readout circuit 310 may include an analog signal processing circuit 450, a digital signal processing circuit 460, a touch control circuit, etc. in order to process a received sensing signal SRX. The analog signal processing circuit 450 may be defined as an analog front-end (AFE) and the digital signal processing circuit 460 may be defined as a digital front-end (DFE), if necessary.

The analog signal processing circuit 450 may include a buffer 451, a filter 452, an amplifier 453, an analog-to-digital converter (ADC), etc.

The buffer 451 may perform an operation of receiving the sensing signal SRX. For example, the buffer 451 may receive the sensing signal in a current form and transfer the sensing signal to the filter without any change or may receive the sensing signal in a capacitance form, convert the capacitance form of the sensing signal into a current form, and transmit the sensing signal having the current form to the filter. Furthermore, the buffer 451 may receive the sensing signal in a current form, and may generate an output signal having a voltage form by converting the current form.

The buffer 451 may be a single buffer that processes a single input signal or may include differential input buffers that receive two or more input signals.

A ratio of internal resistance of the buffer 451 may be differently defined in order to reduce the influences of an input signal and an output signal.

The filter 452 may remove or reduce a frequency band attributable to noise among frequencies of sensing signals. For example, the filter 452 may be a band pass filter having a band pass and a stop pass on the basis of a cut-off frequency. Furthermore, the filter 452 may include one or more high pass filters or one or more low pass filters, and may form a filter system by a combination of one or more high pass filters or one or more low pass filters, if necessary.

The filter 452 may include one or more adjustable filters, if necessary. The adjustable filter may include a variable resistor or a variable capacitor. A value of the adjustable filter may be changed in response to the controlling signal of the touch control circuit. Furthermore, a cut-off frequency or band pass of the adjustable filter may be adjusted depending on the type of touch sensing or a driving mode of the analog signal processing circuit (AFE) or the digital signal processing circuit (DFE).

The filter 452 may change a cut-off frequency into the existing predetermined set value depending on the type of object. In this case, the touch control circuit may perform a step of determining the type of object by receiving a touch sensing signal from a touch electrode and checking set values of a variable resistance or variable capacitance within the adjustable filter.

If the adjustable filter is used, when a plurality of driving frequencies is used in sensing a plurality of objects, one analog signal processing circuit (AFE) may sense and process the plurality of driving frequencies by the adjustable filter.

For example, when signals of a plurality of touch pens using different protocols or using different frequency signals are received, a role or operation of a circuit may be differently set by the adjustable filter within one analog signal processing circuit (AFE) without using a plurality of analog signal processing circuits (AFE).

The sensing signal SRX may include a plurality of signals having different frequencies, and may include signals of frequency bands attributable to noise. A noise signal having a given frequency band can be removed or reduced by the filter 452, and more accurate touch sensing data can be obtained.

The amplifier 453 may generate an analog amplification signal by amplifying an output signal of the filter.

The ADC 454 may generate digital data Data_D through analog-digital conversion for an analog amplification signal.

The sequence and arrangement of the buffer 451, filter 452, amplifier 453, and ADC 454 of the analog signal processing circuit 450 are not limited to a form illustrated in FIG. 5, and may have various forms such as the omission or modification of some elements.

The touch control circuit may transmit, to the analog signal processing circuit (AFE) or the digital signal processing circuit (DFE), a controlling signal to change a frequency pass band of a touch sensing signal that passes through the adjustable filter based on set values. For example, a controlling signal that is used for the touch control circuit to control the analog signal processing circuit (AFE) may be defined as an analog signal processing circuit control signal CTL1. A controlling signal that is used for the touch control circuit to control the digital signal processing circuit (DFE) may be defined as a digital signal processing circuit control signal CTL2.

The touch control circuit may determine a driving mode of the touch sensing circuit depending on the type of object, and may change variable resistance or variable capacitance based on a driving mode of the touch sensing circuit through the adjustable filter within the analog signal processing circuit (AFE). The cut-off frequency of the adjustable filter may be changed according to a control signal of the touch control circuit and frequency signals that a plurality of objects has may be sensed.

The touch control circuit may be a touch micro controller unit (TMCU), but is not limited in type as long as the touch control circuit is capable of controlling the analog signal processing circuit (AFE) or the digital signal processing circuit (DFE).

Figure 6:
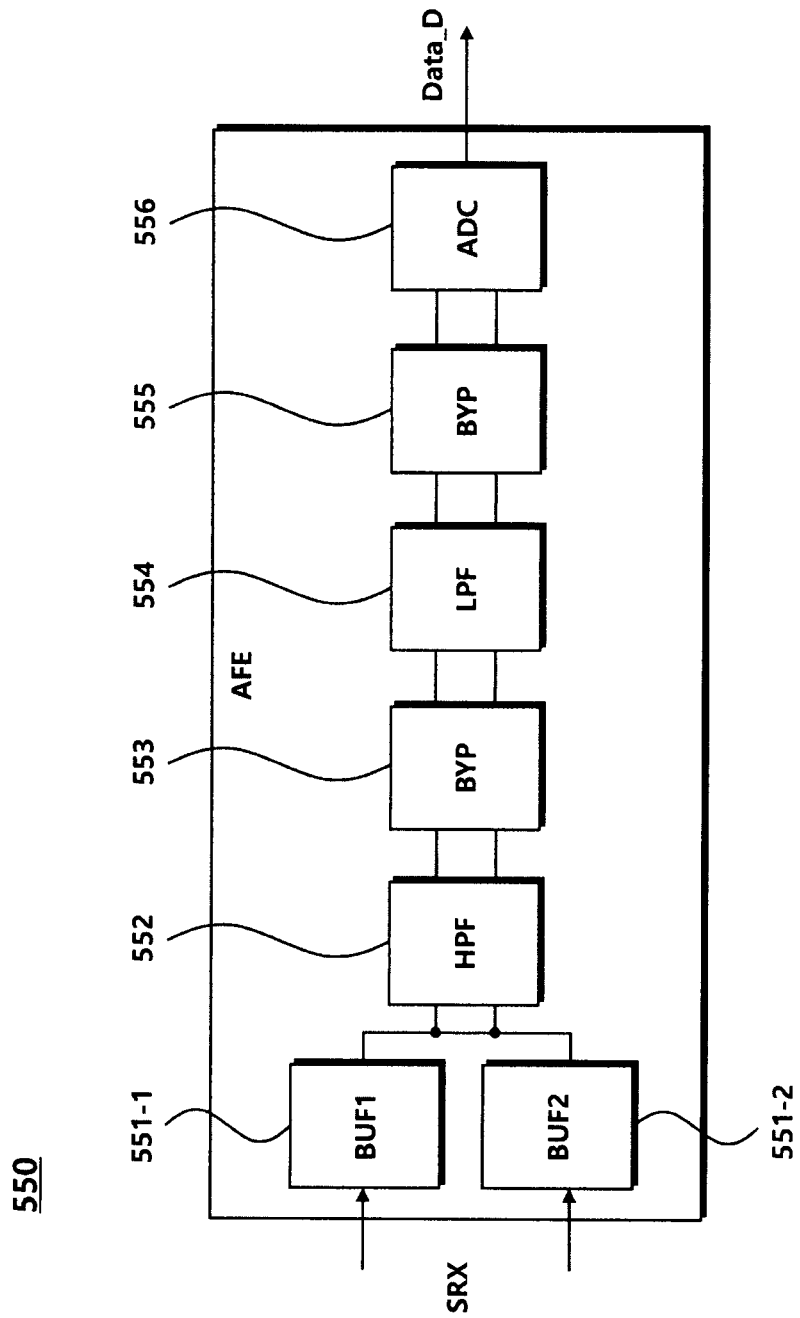
FIG. 6 is a first example diagram illustrating a configuration of an analog signal processing circuit according to an embodiment.

FIG. 6 is a first example diagram illustrating a configuration of an analog signal processing circuit according to an embodiment.

Referring to FIG. 6, an analog signal processing circuit 550 may include a first buffer 551-1, a second buffer 551-2, a high pass filter 552, a first bypass circuit 553, a low pass filter 554, a second bypass circuit 555, an ADC 556, etc.

The first buffer 551-1 and the second buffer 551-2 may receive a plurality of sensing signals SRX and process the received signals in a differential way.

The first buffer 551-1 and the second buffer 551-2 may convert signals about a change in capacitance of a touch electrode into signals about a current, and may output the signals about a current. The outputted signals about a current may be transmitted to the high pass filter 552.

The signals about a current, processed by the first buffer 551-1 and the second buffer 551-2, may pass through the high pass filter 552, the first bypass circuit 553, and the low pass filter 554, thereby being capable of removing or reducing noise in a frequency range having a preset band.

The signals passing through the second bypass circuit 555 and the ADC 556 may be converted into digital data Data_D.

The sensing signal SRX received by the analog signal processing circuit 550 may be a sensing signal attributable to a finger touch or a stylus pen touch. The digital data Data_D converted by the analog signal processing circuit 550 may be transmitted to a digital signal processing circuit (not illustrated).

The sequence and arrangement of the first buffer 551-1, second buffer 551-2, high pass filter 552, first bypass circuit 553, low pass filter 554, second bypass circuit 555, and ADC 556 of the analog signal processing circuit 550 are not limited to a form illustrated in FIG. 6, and may have various other forms such as the omission or integration of some circuits.

Figure 7:
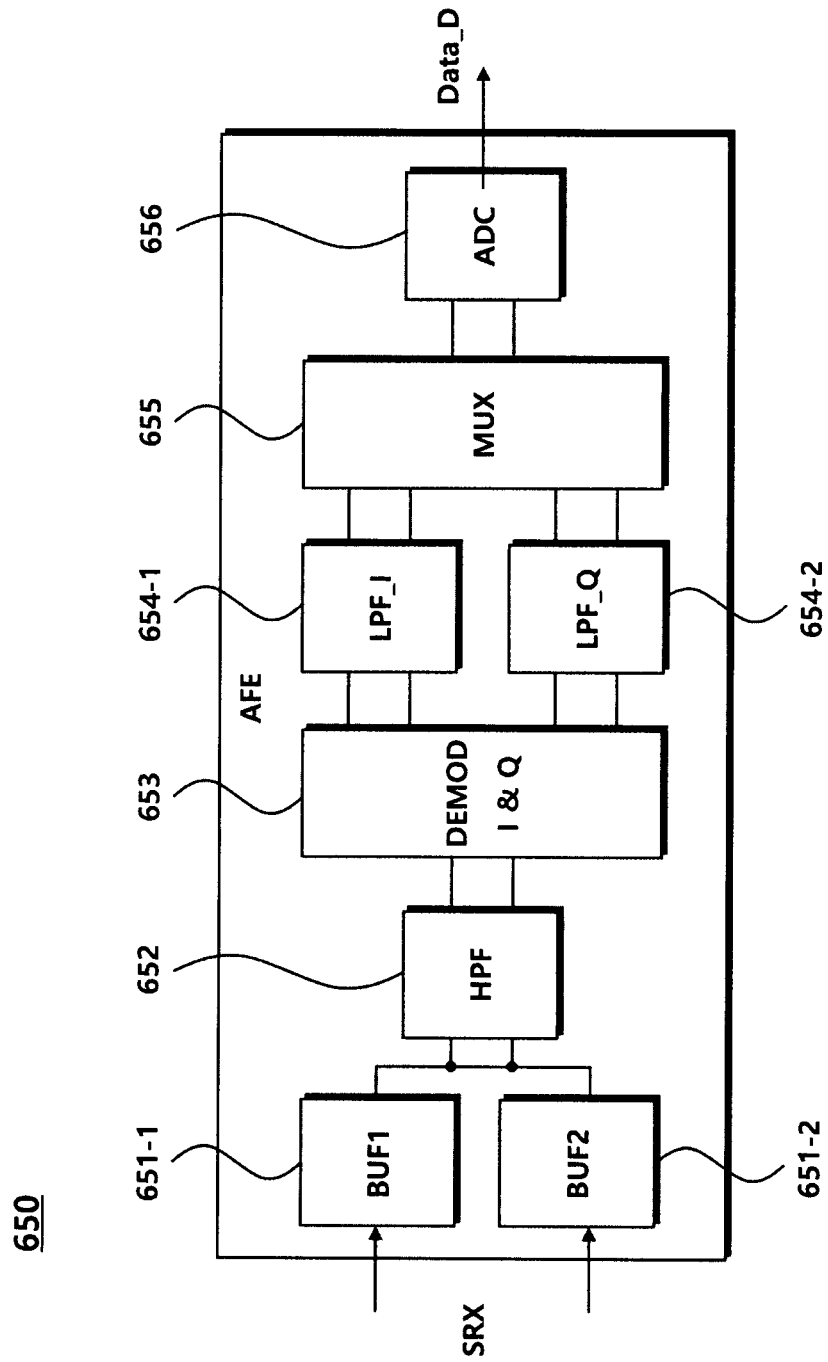
FIG. 7 is a second example diagram illustrating a configuration of an analog signal processing circuit according to an embodiment.

FIG. 7 is a second example diagram illustrating a configuration of an analog signal processing circuit according to an embodiment.

Referring to FIG. 7, an analog signal processing circuit 650 may include a first buffer 651-1, a second buffer 651-2, a high pass filter 652, a demodulation circuit 653, a first low pass filter 654-1, a second low pass filter 654-2, a MUX 655, an ADC 656, etc.

The first buffer 551-1 and the second buffer 551-2 may receive a plurality of sensing signals SRX, may transfer the plurality of received sensing signals SRX to the high pass filter 652, and may remove or reduce noise having a cut-off frequency or less.

The demodulation circuit 653 may process a signal by using an in-phase (IQ) and quadrature demodulation method, and may convert a received signal into a signal having a desired amplitude, phase or frequency.

A signal demodulated by the demodulation circuit 653 may be transmitted to the ADC 656 through the first low pass filter 654-1 and may be transmitted to the ADC 656 through the second low pass filter 654-2.

The MUX 655 may select a signal passing through the first low pass filter 654-1 or a signal passing through the second low pass filter 654-2, and may generate the selected signal as an output. The signal passing through the first low pass filter 654-1 may be define as an I signal, and the signal passing through the second low pass filter 654-2 may be defined as a Q signal, but the present disclosure is not limited thereto.

The MUX 655 may alternately receive and output the I signal and the Q signal in an intersectional way. The MUX may be defined as a multiplexer, if necessary.

The ADC 656 may convert, into a digital signal, an analog signal selected by the MUX 655, and may output the digital signal.

The sensing signal SRX received by the analog signal processing circuit 650 may be a sensing signal attributable to a stylus pen touch. Digital data Data_D converted by the analog signal processing circuit 650 may be transmitted to a digital signal processing circuit (not illustrated).

The sequence and arrangement of the first buffer 651-1, second buffer 651-2, high pass filter 652, demodulation circuit 653, first low pass filter 654-1, second low pass filter 654-2, MUX 655, and ADC 656 of the analog signal processing circuit 650 are not limited to a form illustrated in FIG. 7, and may have various other forms such as the omission or integration of some circuits.

Figure 8:
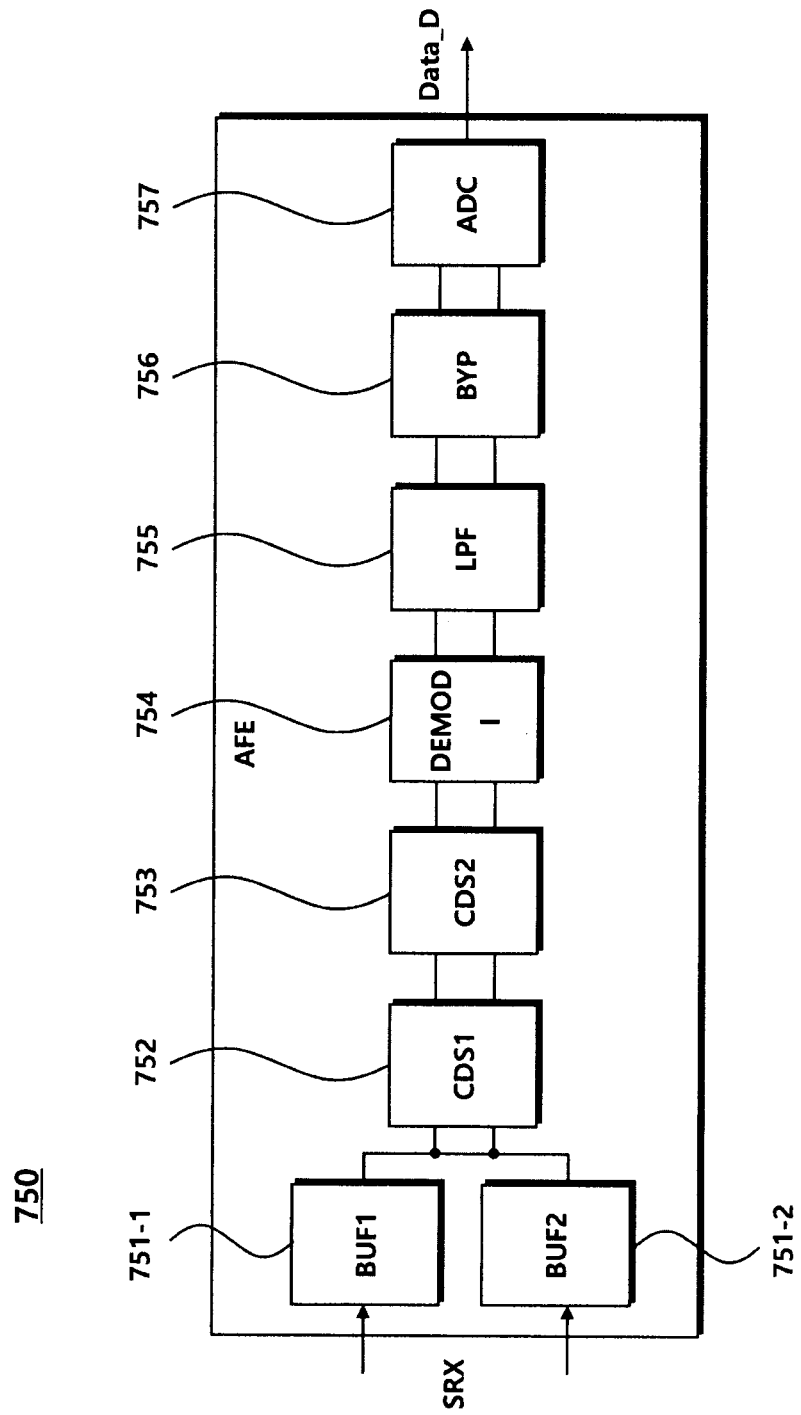
FIG. 8 is a third example diagram illustrating a configuration of an analog signal processing circuit according to an embodiment.

FIG. 8 is a third example diagram illustrating a configuration of an analog signal processing circuit according to an embodiment.

Referring to FIG. 8, an analog signal processing circuit 750 may include a first buffer 751-1, a second buffer 751-2, a first correlated double sampling (CDS) circuit 752, a second CDS circuit 753, a demodulation circuit 754, a low pass filter 755, a bypass circuit 756, an ADC 757, etc.

The first buffer 751-1 and the second buffer 751-2 may process sensing signals SRX received from a touch panel, and may transmit the processed sensing signals to the first CDS circuit 752.

A polarity of a signal may be changed or sampled through the CDS circuit. The CDS circuit may include an integrator, if necessary.

The first CDS circuit 752 and the second CDS circuit 753 may be continuously disposed, and may sense a change in the polarity of a signal having a positive value and a signal having a negative value by sampling the change if the signals are repeated.

The demodulation circuit 754 may demodulate a current signal and output an demodulated current signal, and may transmit a frequency signal which has a band equal to or smaller than a cut-off frequency, that is, a base, and which passes through the low pass filter 755.

A signal passing through the bypass circuit 756 and the ADC 757 may be converted into digital data Data_D.

The sensing signal SRX received by the analog signal processing circuit 750 may be a sensing signal attributable to a finger touch. The digital data Data_D converted by the analog signal processing circuit 750 may be transmitted to a digital signal processing circuit (not illustrated).

Figure 9:
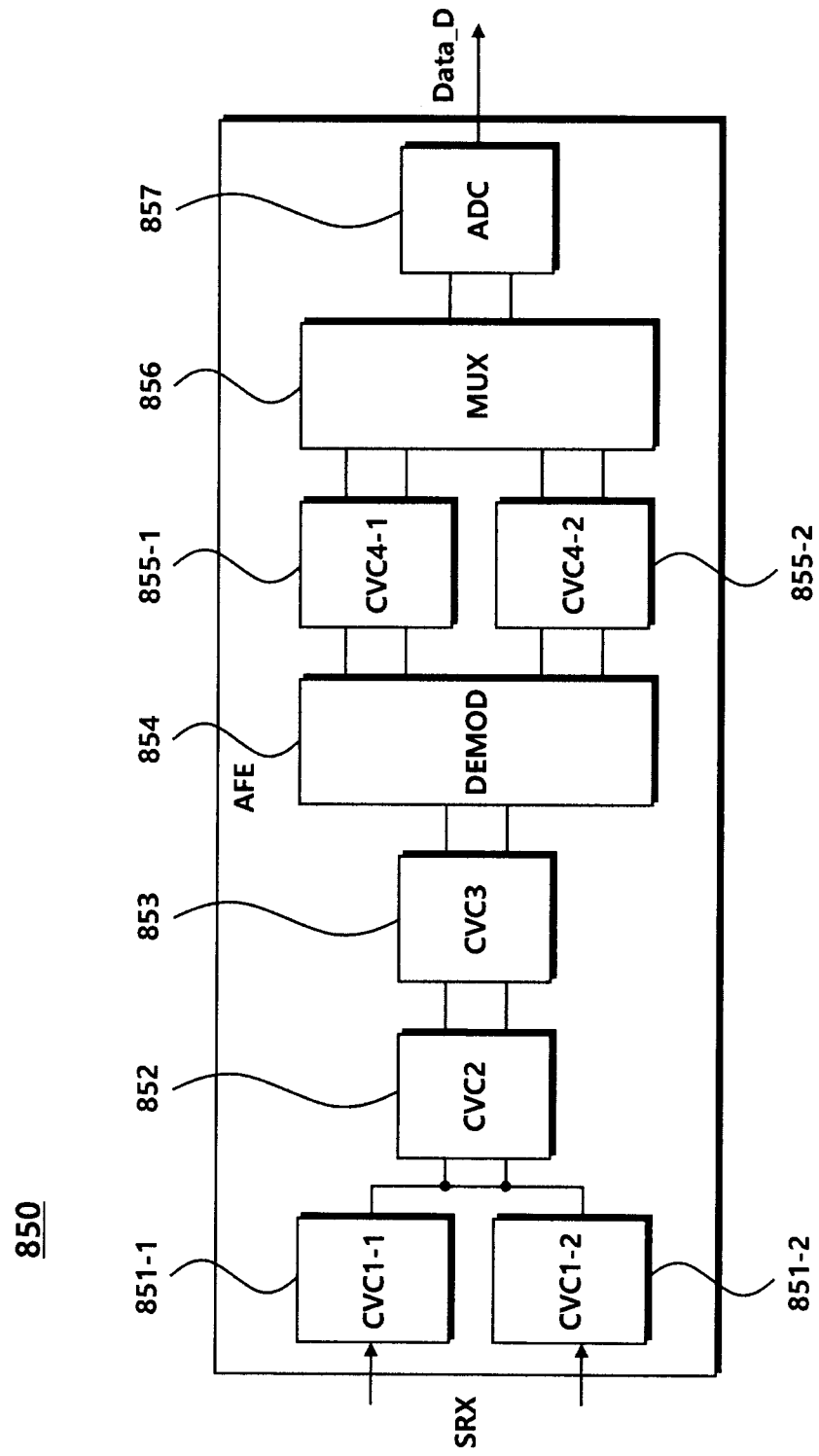
FIG. 9 is a fourth example diagram illustrating a configuration of an analog signal processing circuit according to an embodiment.

FIG. 9 is a fourth example diagram illustrating a configuration of an analog signal processing circuit according to an embodiment.

Referring to FIG. 9, an analog signal processing circuit 850 may include a first current voltage control (CVC) circuit 851-1 and 851-2, a second CVC circuit 852, a third CVC circuit 853, a demodulation circuit 854, a fourth CVC circuit 855-1 and 855-2, a MUX 856, an ADC 857, etc.

The CVC circuit may include one or more switches, and a connection structure thereof may be changed in response to a controlling signal. A role and operation of the CVC circuit may be changed depending on the type of touch sensing and a change in the touch mode. Power consumption of a display device can be reduced and power usage for each touch mode can be checked and adjusted by changing a role within an integrated circuit without forming a separate circuit. A circuit change in the CVC circuit may be determined based on set values of a variable resistance and a variable capacitance.

The first CVC circuit 851-1 and 851-2 may be a buffer, and may convert, into a signal about a current, a signal about a change in capacitance which is sensed in a touch panel, and may output the signal about a current.

The second CVC circuit 852 may be a correlated double sampling (CDS) circuit, and may be a high pass filter, if necessary.

The third CVC circuit 853 may be a CDS circuit, and may be a bypass circuit, if necessary.

The demodulation circuit 854 may process an I signal and a Q signal in order to demodulate a stylus pen touch signal, but may process only an I signal in order to demodulate a finger touch signal. The demodulation circuit 854 may play a role as a bypass circuit, if necessary.

A decoding process may also be performed on a signal demodulated by the demodulation circuit 854.

The fourth CVC circuit 855-1 and 855-2 may be a low pass filter, if necessary. A state of one or more low pass filters may be changed into an off state or a range of a cut-off frequency of the low pass filters may be adjusted depending on the type of touch.

The MUX 856 may selectively output a signal received from the fourth CVC circuit 855-1 and 855-2. The MUX 856 may receive a plurality of input signals, and may sequentially the plurality of input signals and output a selected signal, but may play a role as a bypass circuit when receiving one input signal.

The ADC 857 may convert an analog signal into a digital signal by processing the analog signal, and may output the digital signal.

The CVC circuit may be defined as an adjustable filter, if necessary.

The adjustable filter may include a variable resistor or a variable capacitor, and a variable resistance value or a variable capacitance value thereof may be changed in accordance with a frequency of a sensing signal. The variable resistance value or variable capacitance value of the adjustable filter may be changed in response to a controlling signal received from a touch control circuit (not illustrated).

A frequency pass band or cut-off band of the adjustable filter may be changed in response to a controlling signal. The frequency pass band may mean a band having a given reference value or less and may mean a band within a given range. The adjustable filter may change the band of a frequency passing therethrough by changing the cut-off frequency of a circuit component inside the adjustable filter.

A circuit configuration of the adjustable filter may be changed based on a frequency band of a sensing signal, and may be changed in accordance with a driving mode of a digital signal processing circuit. The digital signal processing circuit may change its operation depending on the type of object. The analog signal processing circuit may receive a signal regarding the operation of the digital signal processing circuit or check a set value to change the frequency pass band of the adjustable filter.

The adjustable filter may be included in an analog signal processing circuit. A driving mode of the analog signal processing circuit may be changed in accordance with a driving mode of a digital signal processing circuit.

The adjustable filter may have another circuit configuration or may perform another operation depending on the type or location of the aforementioned CVC circuit.

The analog signal processing circuit 850 disclosed in FIG. 9 may form one integrated circuit, and a role and operation thereof may be changed into a role and operation of the analog signal processing circuit disclosed in each of FIGS. 6 to 8. For example, in the second CVC circuit 852 and the fourth CVC circuit 855-1 and 855-2, a range of a frequency in which a variable about a variable resistor or a variable capacitor is changed and received may be adjusted.

A change in the circuit role and operation of the analog signal processing circuit 850 may be controlled by a touch control circuit (not illustrated), and may be controlled by a change in the touch mode of a digital signal processing circuit (not illustrated).

Various types of the filters described with reference to FIGS. 6 to 9 may be adjustable filters, and each may change the band of a signal passing therethrough based on a resistance value or capacitance of the adjustable filter by using the aforementioned method. A circuit configuration of the adjustable filter within the analog signal processing circuit (AFE) may be changed through such a method, and the cut-off frequency of the filter may be adjusted for each object type.

Figure 10:
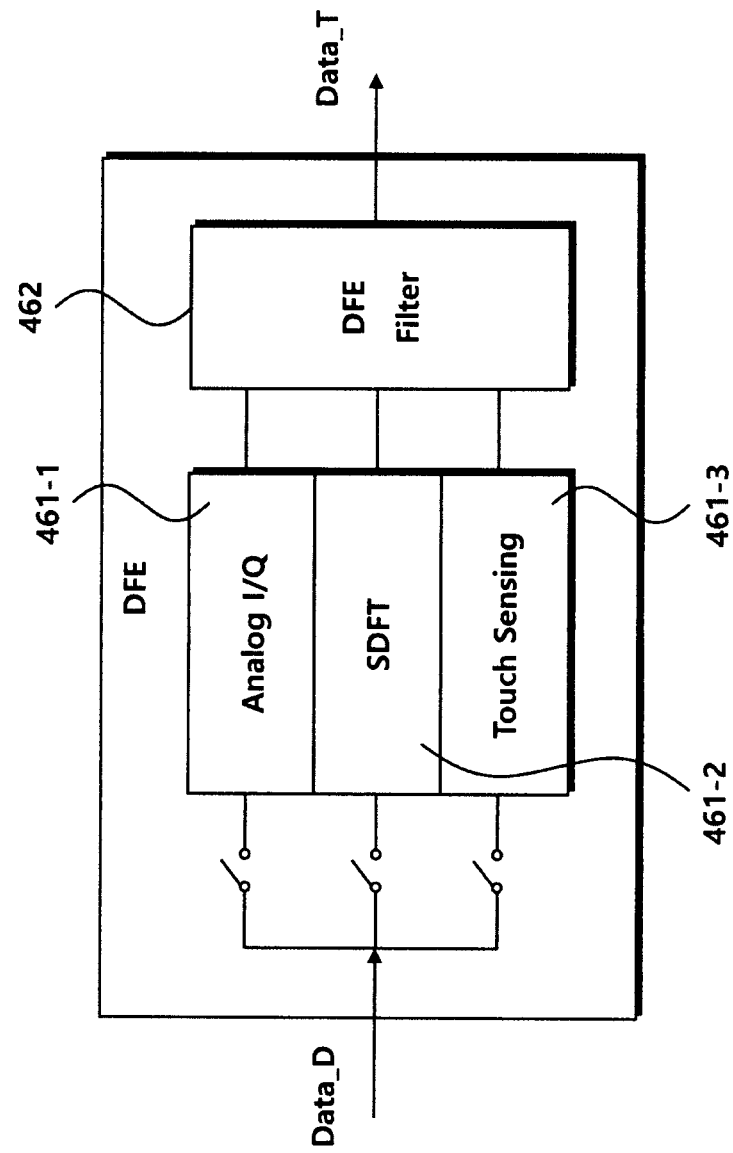
FIG. 10 is a diagram illustrating a configuration of a digital signal processing circuit according to an embodiment.

FIG. 10 is a diagram illustrating a configuration of a digital signal processing circuit according to an embodiment.

Referring to FIG. 10, the digital signal processing circuit 460 may include an analog IQ signal processing circuit 461-1, a sliding discrete Fourier transform (SDFT) signal processing circuit 461-2, a touch sensing signal processing circuit 461-3, and a filter 462.

The digital signal processing circuit 460 may convert digital data Data_D, converted by the analog signal processing circuit 450, into touch sensing data Data_T by processing the digital data Data_D.

The analog IQ signal processing circuit 461-1 may receive an I signal or a Q signal processed by a demodulation circuit (not illustrated), and may perform digital conversion on the I signal or the Q signal.

The SDFT signal processing circuit 461-2 may separate and receive a plurality of frequencies by using a discrete Fourier transform (DFT). The SDFT signal processing circuit 461-2 may perform digital conversion on each of the separated signals having a frequency range. An SDFT may be used as one type of DFT.

The touch sensing signal processing circuit 461-3 may perform digital conversion on a touch sensing signal using the self-capacitive method or the mutual-capacitive method.

A digital conversion mode for the analog IQ signal processing circuit 461-1, SDFT signal processing circuit 461-2, and touch sensing signal processing circuit 461-3 of the digital signal processing circuit 460 may be selected depending on the type of touch input. For example, the digital conversion for a stylus pen sensing signal may be performed by the analog IQ signal processing circuit 461-1 or the SDFT signal processing circuit 461-2. For another example, the digital conversion for a finger sensing signal may be performed by the touch sensing signal processing circuit 461-3.

A digital processing method of the digital signal processing circuit 460 may be differently selected depending on a frequency range of an inputted analog signal.

The filter 462 may perform the filtering of a converted digital signal. If a plurality of frequencies is separated, the filter 462 may obtain a frequency within the existing set range by filtering the frequency or remove the frequency.

The selection of a digital conversion mode for the analog IQ signal processing circuit 461-1, SDFT signal processing circuit 461-2, and touch sensing signal processing circuit 461-3 of the digital signal processing circuit 460 may be controlled by a controlling signal of a touch control circuit (not illustrated). Furthermore, a driving mode of the digital signal processing circuit may be driven in association with a driving mode of the analog signal processing circuit. The driving mode of the digital signal processing circuit (DFE) and the driving mode of the analog signal processing circuit (AFE) may be simultaneously changed or controlled.

If the driving mode of the analog signal processing circuit is changed, a resistance value or capacitance value of the adjustable filter within the analog signal processing circuit may be changed.

Figure 11:
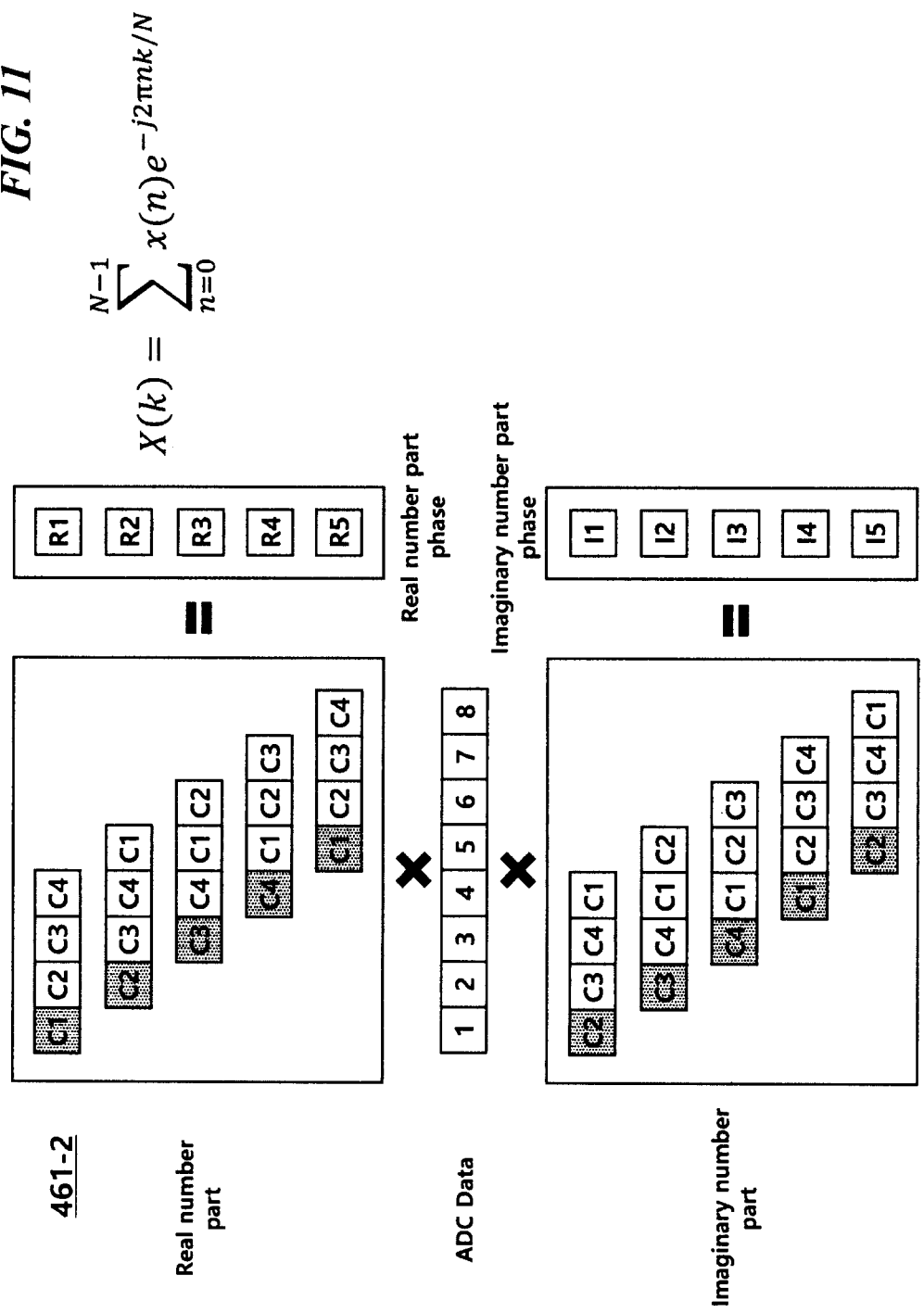
FIG. 11 is a first example diagram for describing a signal processing method of the digital signal processing circuit according to an embodiment.

FIG. 11 is a first example diagram for describing a signal processing method of the digital signal processing circuit according to an embodiment.

FIG. 11 shows a process of processing a signal, which is performed by the SDFT signal processing circuit 461-2.

The digital signal processing circuit 460 may receive a signal processed by the analog signal processing circuit 450, and may perform a DFT on the signal.

The DFT is a discrete Fourier transform for an input signal, and may be performed on the input signal for a plurality of frequencies. A fast Fourier transform (FFT) may be used as one method of the DFT.

The SDFT signal processing circuit 461-2 may perform the DFT to determine whether the input signal is included in a specific frequency range and determine whether a stylus pen touch and a finger touch are present and the type of stylus pen touch and finger touch.

The SDFT signal processing circuit 461-2 may perform digital conversion by sequentially operating the signals inputted for the DFT.

$$X(k) = \sum_{n=0}^{N-1} x(n)e^{-j2\pi nk/N}$$

(X(k)=an output signal, x(n)=a continuous function, k=an input signal, n=an integer equal to or greater than 0, N=an integer equal to or greater than 1)

c(n) may be defined and used as DFT coefficients by discretizing the continuous function of x(n).

As the capacity of a data memory required for the number of data samplings is increased, an SDFT may be performed in order to reduce the capacity of the data memory.

The DFT coefficients may be another data set formed by changing the sequence of C1, C2, C3, and C4, that is, one sampling data set.

DFT coefficients of a real part may form, as data sets, a first real part data set C1, C2, C3, C4, a second real part data set C2, C3, C4, C1, a third real part data set C3, C4, C1, C2, a fourth real part data set C4, C1, C2, C3, and a fifth real part data set C1, C2, C3, C4. The real part data sets may be defined as R1, R2, R3, R4, and R5, respectively.

DFT coefficients of an imaginary part may form, as data sets, a first imaginary part data set C2, C3, C4, C1, a second imaginary part data set C3, C4, C1, C2, a third imaginary part data set C4, C1, C2, C3, a fourth imaginary part data set C1, C2, C3, C4, and a fifth imaginary part data set C2, C3, C4, C1. The imaginary part data sets may be defined as I1, I2, I3, I4, and I5, respectively.

The real part data sets and the imaginary part data sets may be defined in a way to correspond to 1, 2, 3, 4, 5, 6, 7, and 8, that is, analog-to-digital converter data.

Each of real part data and imaginary part data may include data about a phase.

Figure 12:
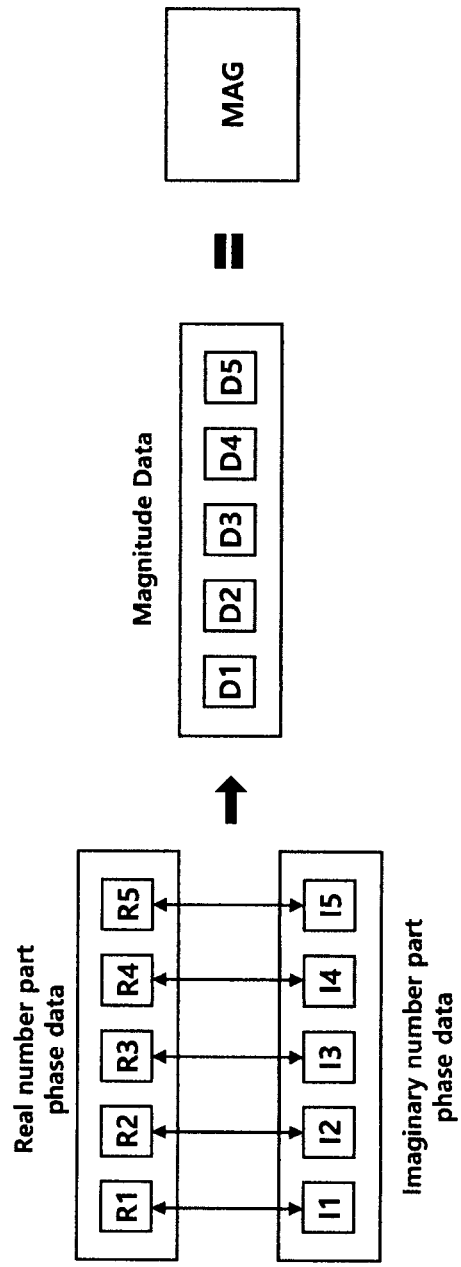
FIG. 12 is a second example diagram for describing a signal processing method of the digital signal processing circuit according to an embodiment.

FIG. 12 is a second example diagram for describing a signal processing method of the digital signal processing circuit according to an embodiment.

FIG. 12 shows a process of processing a signal, which is performed by the SDFT signal processing circuit 461-2.

A real part data set or an imaginary part data set may be defined as real part values and imaginary part values, respectively.

Real part values R1, R2, R3, R4, and R5 may correspond to imaginary part values I1, I2, I3, I4, and I5, respectively, and may be calculated as a root mean square to generate magnitude data.

Final data MAG may be generated by calculating average values after square root is performed on the sum of squares of each of the real part values R1, R2, R3, R4, and R5 and each of the imaginary part values I1, I2, I3, I4, and I5.

Data having high accuracy can be extracted by a small number of data samplings through an SDFT.

The digital signal processing circuit 460 may separate and sense multiple frequencies through an SDFT.

Figure 13:
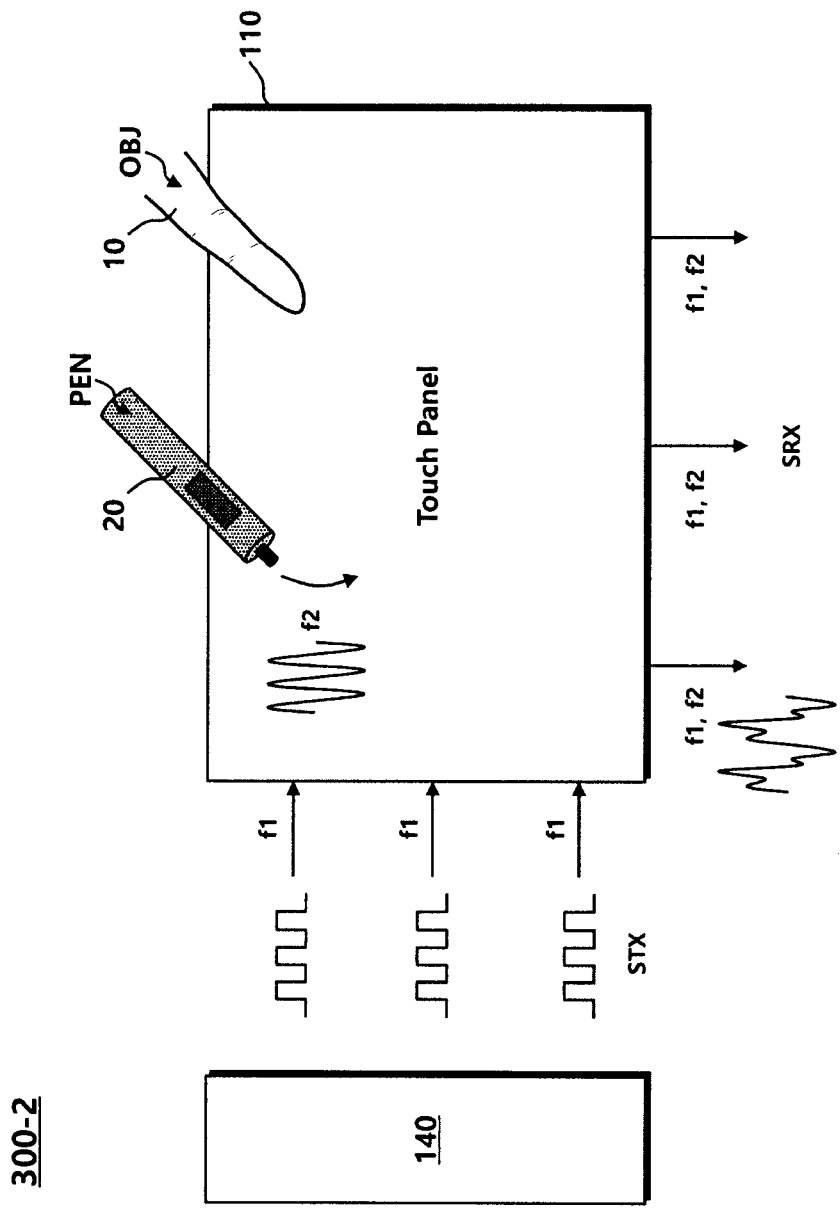
FIG. 13 is a diagram for describing a process of sensing touches of a stylus pen and a finger by multiple frequencies according to an embodiment.

FIG. 13 is a diagram for describing a process of sensing touches of a stylus pen and a finger by multiple frequencies according to an embodiment.

Referring to FIG. 13, a frequency of a driving signal STX transmitted by the touch sensing circuit 140 may be a first frequency f1, and a frequency transmitted by a stylus pen may be a second frequency f2.

When the stylus pen 20 and the finger 10 are simultaneously sensed in the touch sensing system 300-2, the panel 110 may transmit, to a readout circuit (not illustrated), a sensing signal SRX including first frequency and second frequency components.

If the sensing signal SRX is time-divided and sensed, each of the first frequency and the second frequency may be sensed in a separate time section. If the sensing signals SRX are driven in the same time section, the first frequency and the second frequency may be simultaneously sensed in the state in which the first frequency and the second frequency have been mixed.

If the sensing signal SRX is time-divided and sensed, the size of a circuit system is increased because each of the first frequency and the second frequency requires a separate circuit configuration in order to be sensed in a separate time section.

The aforementioned adjustable filter can change a frequency pass band of the sensing signal SRX by changing a resistance value or capacitance value within the adjustable filter. Accordingly, the size of a circuit system and power consumption can be reduced because different frequencies can be sensed by one circuit.

Figure 14:
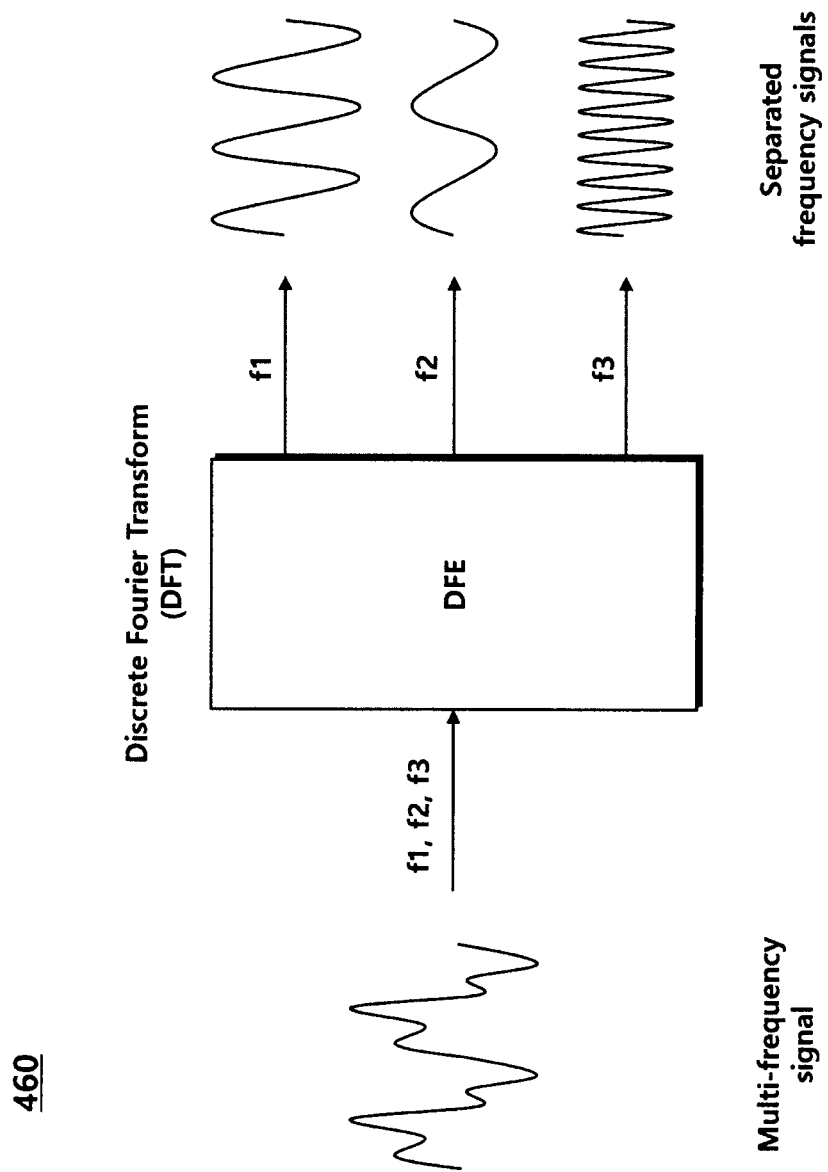
FIG. 14 is a diagram for describing a method of separating, by the digital signal processing circuit, multiple frequencies according to an embodiment.

FIG. 14 is a diagram for describing a method of separating, by the digital signal processing circuit, multiple frequencies according to an embodiment.

Referring to FIG. 14, the digital signal processing circuit (DFE) may receive, as an analog signal, a multi-frequency signal having a state in which a first frequency f1, a second frequency f2, and a third frequency f3 are mixed.

The digital signal processing circuit (DFE) may separate frequency components of the received signals by performing the aforementioned DFT on the signals, and may separate and output signals for the respective separated frequency bands.

A determination of each frequency region may be performed by a filter (not illustrated).

Frequency processing processes using a DFT method may be simultaneously performed within the same time section.

Figure 15:
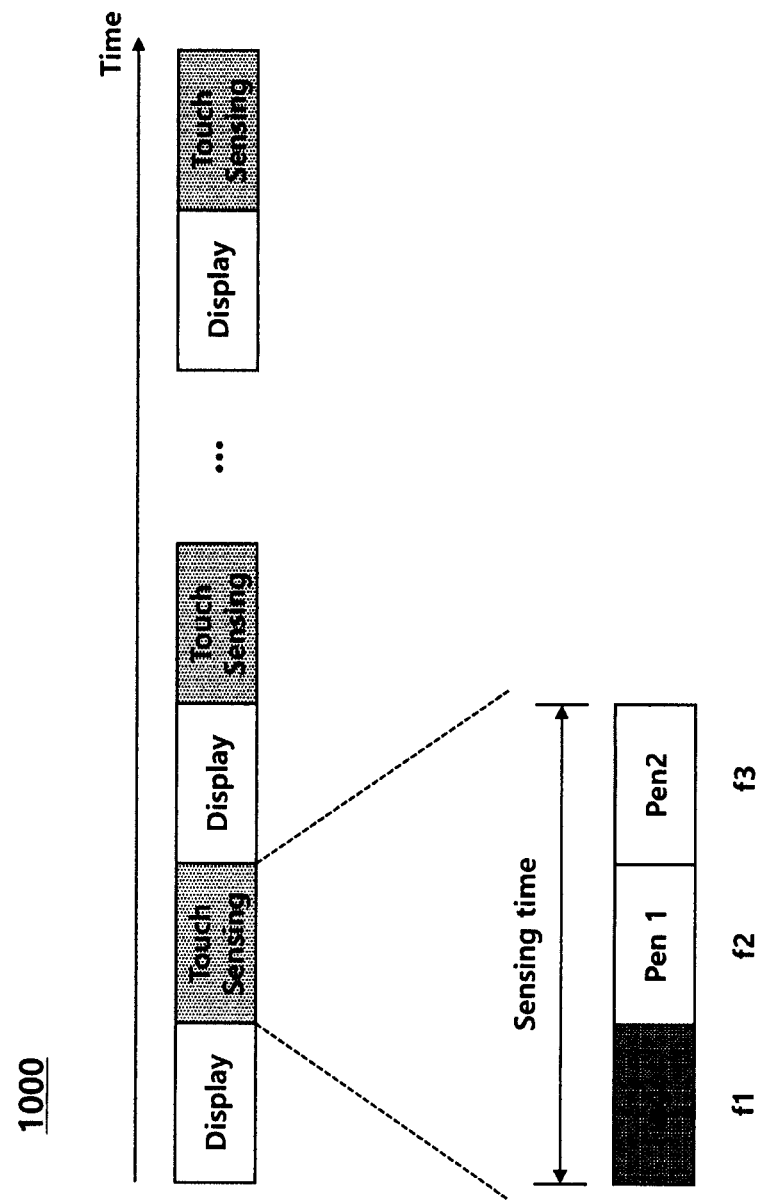
FIG. 15 is a diagram for describing a conventional touch sensing method based on time division.

FIG. 15 is a diagram for describing a conventional touch sensing method based on time division.

Referring to FIG. 15, in a touch sensing method 1000, a panel may be driven by distinguishing between the display driving period or touch sensing period of the display device 100. The touch sensing period may be defined as a period in which a driving signal is transmitted or a sensing signal is received, if necessary.

The display driving period DP and the touch sensing period TP may be alternate as temporally separated periods.

When a plurality of objects touches or approaches a panel, the touch sensing period of each object may be time-divided and sensing may be individually performed, within one touch sensing section.

For example, a finger touch sensing period, a touch sensing period of a first stylus pen, and a touch sensing period of a second stylus pen may be distinguished from one another and sequentially performed.

In order to sense a finger touch, a touch of the first stylus pen, and a touch of the second stylus pen by distinguishing between the touches, a frequency band of each sensing signal may be defined and sensed as a first frequency, a second frequency, and a third frequency. The first frequency to the third frequency may be selected as different frequencies for more accurate touch sensing, but may be selected as the same frequency, if necessary.

If the sensing of touches of a plurality of objects is performed based on time division, a plurality of circuit configurations for forming a plurality of frequency pass bands is necessary because a touch sensing signal having different frequencies needs to be received.

If an analog signal processing circuit (AFE) including one or more adjustable filters that transmit some of frequency regions of a touch sensing signal is used, a resistance value or capacitance value of an adjustable filter may be changed in response to a controlling signal from a touch control circuit (not illustrated), so a frequency pass band of the touch sensing signal may be changed. Accordingly, efficiency of consumption power can be increased because regions of a circuit can be further integrated. The analog signal processing circuit (AFE) may detect the change in frequency for each time section of a touch sensing signal to receive touch sensing signals respectively having different frequencies.

In a process of sensing touches of a plurality of objects based on time division, a touch control circuit (not illustrated) may determine the type of object by receiving a touch sensing signal, and may change a cut-off frequency of a high pass filter or low pass filter within the adjustable filter depending on the type of object.

The touch control circuit (not illustrated) can control all the elements of the touch control circuit in batches because an internal circuit configuration of the adjustable filter of the analog signal processing circuit (AFE) can be changed in accordance with a driving mode of the digital signal processing circuit (DFE) in different time sections.

The touch control circuit (not illustrated) may control an operation or state of the analog signal processing circuit (AFE) based on one stored set value and may control an operation or state of the digital signal processing circuit (DFE) simultaneously with or separately from the control of the operation or state of the analog signal processing circuit (AFE).

Figure 16:
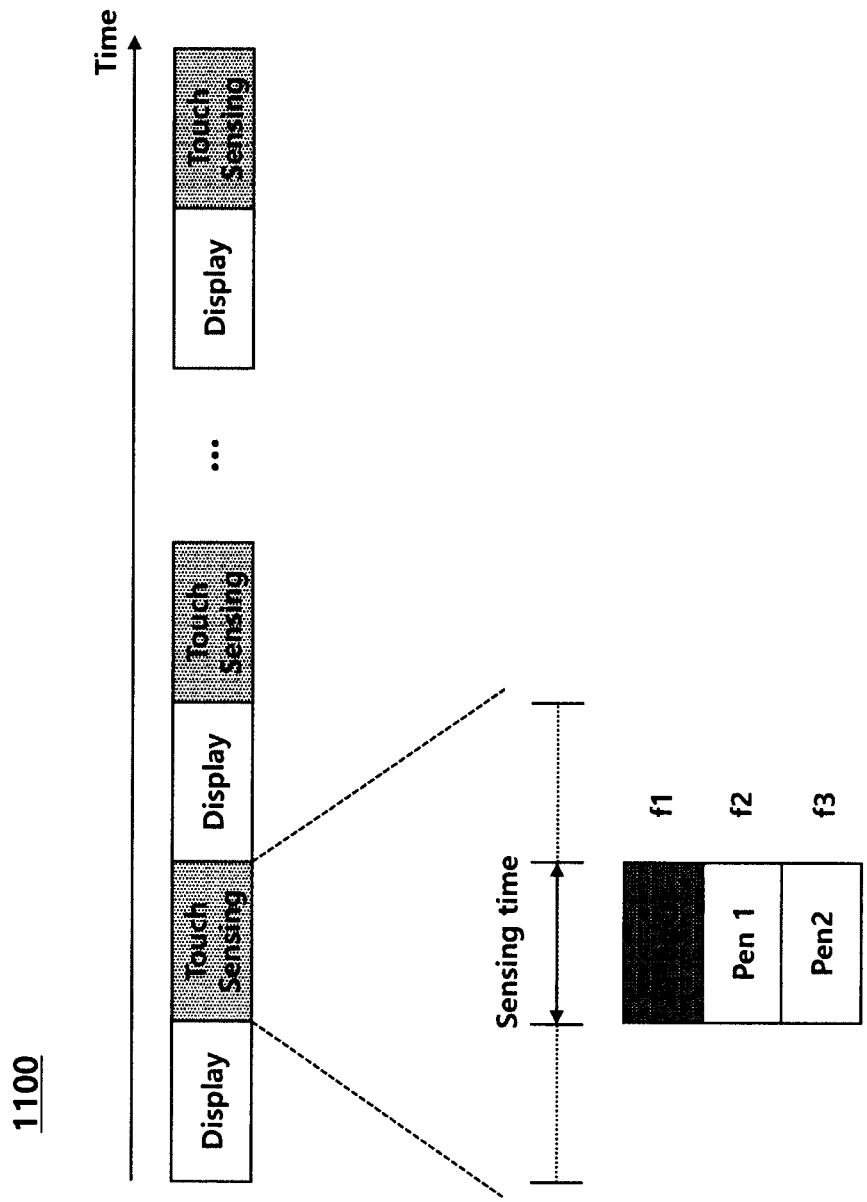
FIG. 16 is a diagram for describing a touch-simultaneous sensing method according to an embodiment.

FIG. 16 is a diagram for describing a touch-simultaneous sensing method according to an embodiment.

Referring to FIG. 16, unlike the existing touch sensing method, a finger touch, a first stylus pen, and a second stylus pen touch may be simultaneously sensed.

In a touch sensing method 1100, a panel may be driven by distinguishing between the display driving period and touch sensing period of the display device 100, but a plurality of objects may be sensed in the same time section of a specific one touch sensing period.

The digital signal processing circuit (DFE) can simultaneously process data in a way to drive a finger and a pen in different frequencies by simultaneously performing DFTs.

In this case, if orthogonality is maintained between the different frequencies, accuracy of the data can be improved.

A driving time of a touch panel and the use of consumption power can be reduced because the digital signal processing circuit (DFE) can simultaneously sense multiple frequencies through DFTs. In this case, a data sampling rate can be increased because a required time for and the number of data samplings can be reduced.

In order for the digital signal processing circuit (DFE) to perform a DFT, data pre-processing may be necessary for the analog signal processing circuit (AFE). In this case, the area of the analog signal processing circuit (AFE) can be reduced by forming an integrated analog signal processing circuit (AFE) without forming a separate circuit.

Figure 17:
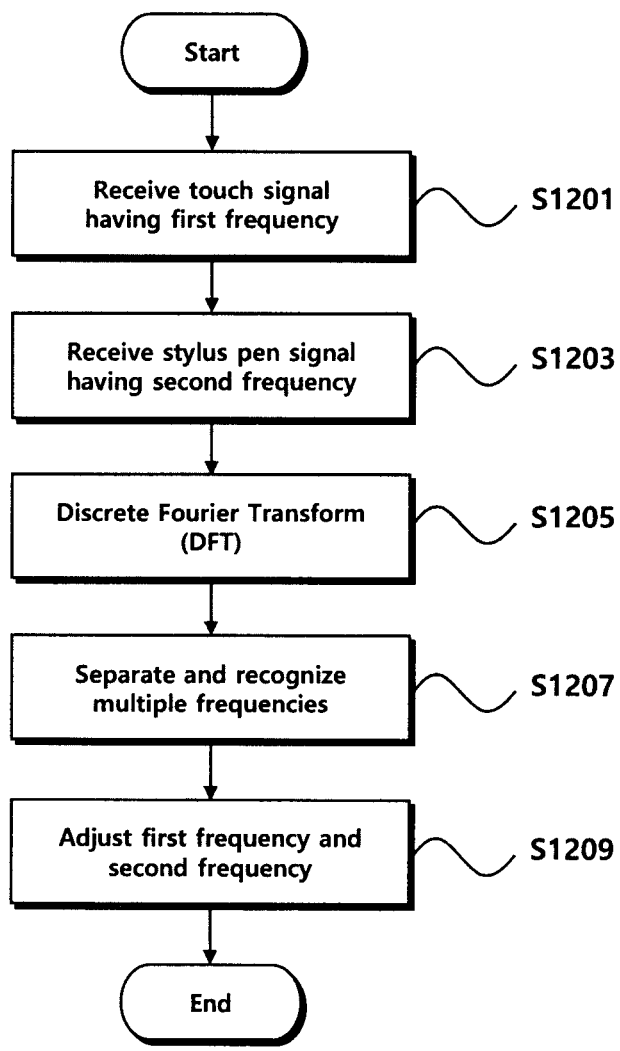
FIG. 17 is a flowchart for describing a frequency adjustment method for touch sensing according to an embodiment.

FIG. 17 is a flowchart for describing a frequency adjustment method for touch sensing according to an embodiment.

Referring to FIG. 17, a frequency adjustment method 1200 for touch sensing may include a step S1201 of receiving a touch signal having a first frequency, a step S1203 of receiving a stylus pen signal having a second frequency, a step S1205 of performing, by the digital signal processing circuit, a DFT, a step S1207 of separating and recognizing multiple frequencies, a step S1209 of adjusting the separated first frequency and second frequencies, etc.

In the step S1201 of receiving the touch signal having the first frequency, the driving circuit of the readout circuit may transmit a driving signal STX having the first frequency, may receive a touch signal of an object, and may receive a sensing signal SRX having the first frequency.

The object may be one or more fingers or one or more stylus pens, but is not limited thereto.

The first frequency may mean one or more frequency sets, and may mean a frequency set transmitted to a sensing line in the same time. Signals transmitted to respective sensing lines may maintain orthogonality, if necessary. The number or form of frequencies of the signals transmitted to the sensing lines may be differently defined depending on the type of object or a state of a display device.

The driving signal STX and the sensing signal SRX having the first frequency may be controlled by the touch control circuit or the timing controller within the touch sensing circuit.

In the step S1203 of receiving the stylus pen signal having the second frequency, the readout circuit may receive a downlink signal DL about state information or touch information of a device by a stylus pen. The stylus pen may transmit the downlink signal having the second frequency band distinguished from the first frequency. The stylus pen may generate the downlink signal having the second frequency band by a unique power device or frequency generator, but may generate the downlink signal DL having the second frequency corresponding to a frequency of an uplink signal UL transmitted by the touch panel.

The second frequency may mean one or more frequency sets, and may mean a frequency set transmitted to a sensing line in the same time. Signals of a second frequency set may be set or controlled to maintain orthogonality to signals of a first frequency set, if necessary.

In the step S1205 of performing, by the digital signal processing circuit, the DFT, the digital signal processing circuit may separate or process a sensing signal through the aforementioned method, such as a DFT, an FFT, or an SDFT.

In the step S1207 of separating and recognizing the multiple frequencies, the converted first frequency and second frequency may be separated and recognized.

In the step S1209 of adjusting the separated first frequency and second frequency, if orthogonality is not maintained between the first frequency and the second frequency, orthogonality may be maintained by controlling the first frequency or the second frequency.

The touch control circuit may control the first frequency, that is, a driving frequency of the touch panel, in accordance with the second frequency defined based on a protocol of a stylus pen.

The stylus pen may control the second frequency by changing its protocol in accordance with the first frequency defined as a driving frequency of the touch panel.

The sequence of the steps of the frequency adjustment method 1200 for touch sensing may be changed or some of the steps may be omitted.

Figure 18:
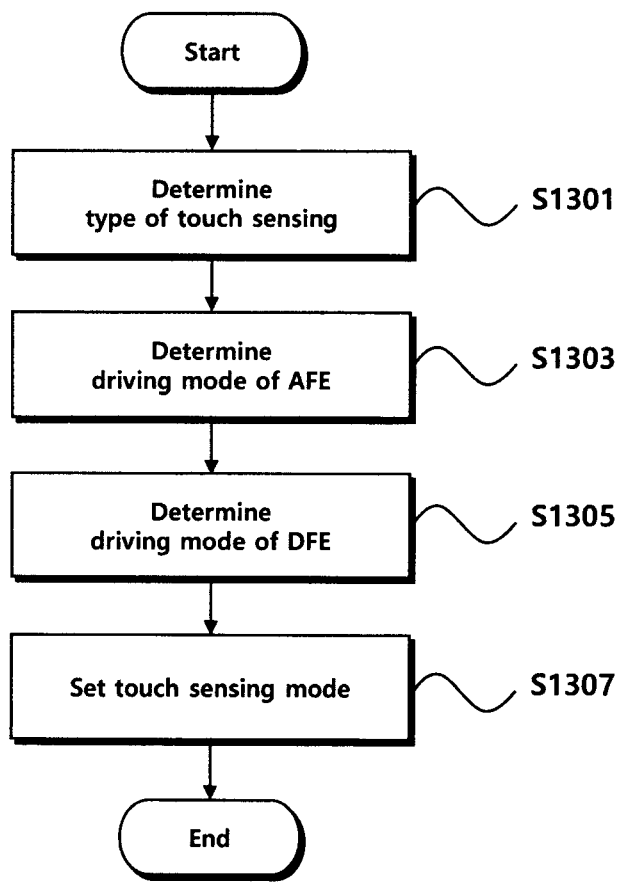
FIG. 18 is a flowchart for describing a method of setting a touch sensing mode according to an embodiment.

FIG. 18 is a flowchart for describing a method of setting a touch sensing mode according to an embodiment.

Referring to FIG. 18, a method 1300 of setting a touch sensing mode may include a step S1301 of determining the type of touch sensing, a step S1303 of determining a driving mode of the analog signal processing circuit, a step S1305 of determining a driving mode of the digital signal processing circuit, a step S1307 of setting a touch sensing mode, etc.

In the step S1301 of determining the type of touch sensing, a signal characteristic according to the type of object may be determined, and a finger touch and a stylus pen touch may be distinguished from each other and determined. The type of touch sensing may be determined by taking into consideration a touch area, touch intensity, a downlink signal, etc.

In the step S1303 of determining a driving mode of the analog signal processing circuit, a driving mode of the analog signal processing circuit may be determined by taking into consideration the type of touch sensing, the type of stylus pen, etc.

An operation and role of a circuit may be differently defined or changed based on a driving mode of the analog signal processing circuit.

For example, a WGP type stylus pen may operate in the driving mode of the analog signal processing circuit (AFE) described with reference to FIG. 6.

For example, an active electrostatic (AES) type stylus pen may operate in the driving mode of the analog signal processing circuit (AFE) described with reference to FIG. 7.

For example, a finger touch may operate in the driving mode of the analog signal processing circuit (AFE) described with reference to FIG. 8.

The analog signal processing circuit (AFE) described with reference to FIG. 9 may change only a circuit configuration depending on the type of touch sensing, and may change an operation according to the type of touch sensing in one integrated analog signal processing circuit (AFE).

In the step S1305 of determining a driving mode of the digital signal processing circuit, a driving mode of the digital signal processing circuit (DFE) may be determined by taking into consideration the type of touch sensing described with reference to FIG. 10 and an operation of the analog signal processing circuit (AFE).

In the step S1307 of setting the touch sensing mode, the touch control circuit (not illustrated) may determine the final touch sensing mode by synthesizing the results of the determinations of the step S1301 of determining the type of touch sensing, the step S1303 of determining a driving mode of the analog signal processing circuit and the step S1305 of determining a driving mode of the digital signal processing circuit. The touch sensing circuit may change an operation of the analog signal processing circuit (AFE) and may change an operation of the digital signal processing circuit (DFE), based on the determined touch sensing mode.

The sequence of the steps of the method 1300 of setting a touch sensing mode may be changed or some of the steps may be omitted.

Figure 19:
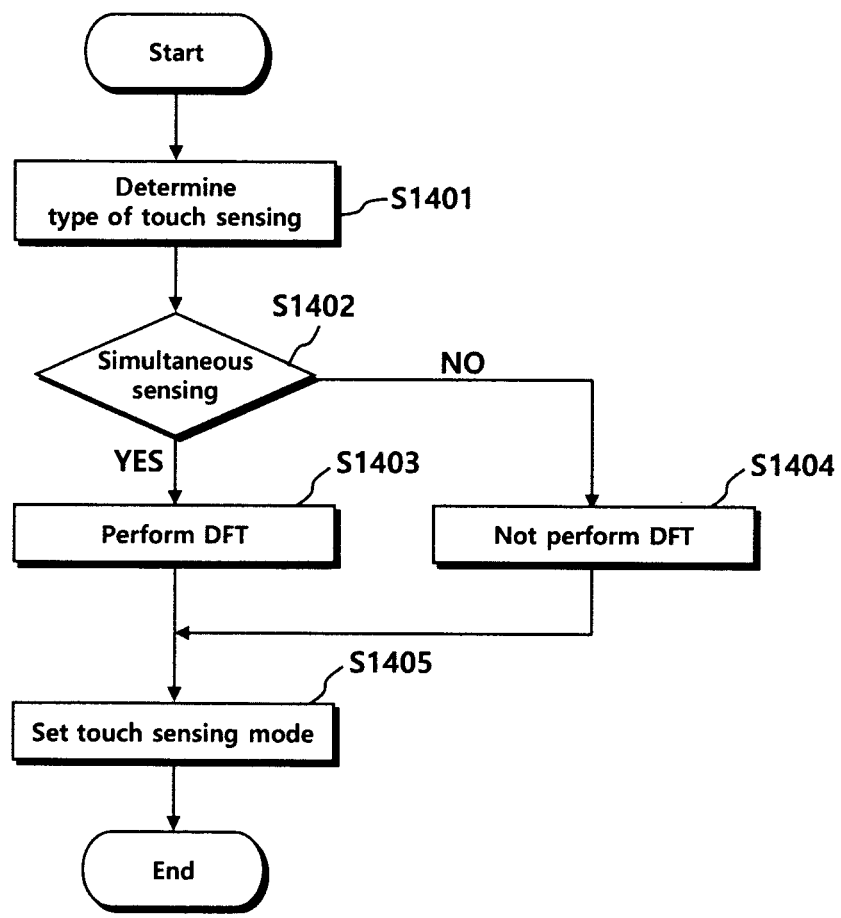
FIG. 19 is a flowchart for describing a touch sensing method in which the simultaneous sensing of touches of a stylus pen and a finger is taken into consideration according to an embodiment.

FIG. 19 is a flowchart for describing a touch sensing method in which the simultaneous sensing of touches of a stylus pen and a finger is taken into consideration according to an embodiment.

Referring to FIG. 19, a touch sensing method 1400 may include a step S1401 of determining the type of touch sensing, an object simultaneous sensing determination step S1402, a DFT execution step S1403, a DFT non-execution step S1404, a touch sensing mode setting step S1405, etc.

In the step S1401 of determining the type of touch sensing, the type of touch sensing may be determined using the aforementioned method of FIG. 18.

In the object simultaneous sensing determination step S1402, the number of objects whose touch or approach is recognized may be determined, and the type of object may be determined.

If one object is recognized, such sensing is not determined as simultaneous sensing and a DFT may not be performed.

If a plurality of objects is recognized, such sensing is determined as simultaneous sensing, and a DFT may be performed. In this case, the method 1400 may further include a step of previously taking into consideration whether a DFT is present depending on a waveform of a sensed signal.

In the DFT execution step S1403, the digital signal processing circuit (DFE) may perform a DFT, and the aforementioned operation methods may be used.

In the DFT non-execution step S1404, a DFT is not performed and the bypass circuit may be passed, or another driving mode within the digital signal processing circuit may be performed.

In the touch sensing mode setting step S1405, a driving mode of touch sensing may be determined. The touch sensing circuit (not illustrated) may change or control an operation or circuit configuration of the analog signal processing circuit (AFE) or the digital signal processing circuit (DFE) based on a driving mode of touch sensing.

What is claimed is:

1. A touch sensing circuit comprising:
an analog signal processing circuit comprising first and second buffers connected in parallel and configured to receive a plurality of touch sensing signals from a touch electrode of a panel and process the received plurality of touch sensing signals in a differential way, and one or more adjustable filters configured to receive the processed plurality of touch sensing signals from the first and second buffers and to transmit a part of a frequency band of the processed plurality of touch sensing signals; and
a touch control circuit configured to determine a change in capacitance of the touch electrode attributable to an object approaching the panel and to transmit a controlling signal to control the adjustable filters of the analog signal processing circuit,
wherein the adjustable filter comprises a variable resistor or a variable capacitor and a resistance value or capacitance value of the adjustable filter is changed in response to the controlling signal to change a frequency pass band of the touch sensing signal, and
wherein the adjustable filter is configured to operate as a correlated double sampling (CDS) circuit in a finger touch mode and operates as a high pass filter in a stylus pen touch mode.

2. The touch sensing circuit of claim 1, wherein the plurality of touch sensing signals are generated by a downlink signal transmitted by the object approaching the panel.

3. The touch sensing circuit of claim 1, wherein a frequency pass band of the adjustable filter is changed in response to the controlling signal.

4. The touch sensing circuit of claim 1, wherein the analog signal processing circuit changes a cut-off frequency of the high pass filter or low pass filter in the adjustable filter depending on a type of object.

5. The touch sensing circuit of claim 1, wherein the touch control circuit determines a type of object by receiving the plurality of touch sensing signals.

6. The touch sensing circuit of claim 1, further comprising a digital signal processing circuit configured to process a signal received from the analog signal processing circuit,
wherein the analog signal processing circuit changes its operation in accordance with a driving mode of the digital signal processing circuit changed depending on a type of object.

7. The touch sensing circuit of claim 1, wherein the analog signal processing circuit further comprises:
a demodulation circuit configured to receive and demodulate a signal passing through the first and second buffers; and
an analog-to-digital converter configured to receive the signal demodulated by the demodulation circuit and to convert the received signal into a digital signal.

8. The touch sensing circuit of claim 1, wherein the analog signal processing circuit detects the change in frequency for each time section of the touch sensing signal to receive the plurality of touch sensing signals respectively having different frequencies.

9. A touch and display driving integrated circuit comprising:
an analog signal processing circuit comprising first and second buffers connected in parallel and configured to receive a plurality of touch sensing signals from a touch electrode of a panel and process the received plurality of touch sensing signals in a differential way, and one or more filters each configured to receive the processed plurality of touch sensing signals from the first and second buffers in a touch driving period among periods time-divided into a display driving period and the touch driving period and to remove noise of the plurality of touch sensing signals; and
a digital signal processing circuit configured to convert a signal received from the analog signal processing circuit into a digital signal,
wherein the filter comprises an adjustable filter having a frequency pass band changed depending on a type of touch sensing signal, and
wherein the adjustable filter is configured to operate as a correlated double sampling (CDS) circuit in a finger touch mode and operates as a high pass filter in a stylus pen touch mode.

10. The touch and display driving integrated circuit of claim 9, wherein the adjustable filter comprises one or more high pass filters or one or more low pass filters.

11. The touch and display driving integrated circuit of claim 9, wherein the analog signal processing circuit further comprises:
- a demodulation circuit configured to receive and demodulate a signal passing through a buffer; and
- a multiplexer (MUX) configured to sequentially select one among the signals demodulated by the demodulation circuit and transmit a selected signal.

12. The touch and display driving integrated circuit of claim 9, wherein:
- an operation of the analog signal processing circuit is changed in accordance with an operation of the digital signal processing circuit, and
- the digital signal processing circuit changes its driving mode in response to a driving mode of a panel, which is the finger touch mode or the stylus pen touch mode.

13. The touch and display driving integrated circuit of claim 9, wherein the adjustable filter comprises one or more current voltage control circuits and opens or closes the one or more current voltage control circuits in a finger touch mode.

14. The touch and display driving integrated circuit of claim 9, wherein the adjustable filter changes the band of a frequency passing therethrough by changing the cut-off frequency.

15. A touch sensing method performed by a touch sensing circuit comprising an analog signal processing circuit, comprising:
- determining a type of object by receiving a touch sensing signal sensed in a touch electrode of a panel;
- checking a set value of a variable resistance or a variable capacitance of an adjustable filter in a touch sensing circuit based on the type of object; and
- changing a frequency pass band of the touch sensing signal passing through the adjustable filter based on the set value,
- wherein the analog signal processing circuit comprises first and second buffers connected in parallel and configured to receive a plurality of touch sensing signals from a touch electrode of a panel and process the received plurality of touch sensing signals in a differential way, and
- wherein the adjustable filter is configured to operate as a correlated double sampling (CDS) circuit in a finger touch mode and operates as a high pass filter in a stylus pen touch mode.

16. The touch sensing method of claim 15, further comprising determining a driving mode of the touch sensing circuit based on the type of object,
- wherein the adjustable filter changes the variable resistance or the variable capacitance based on the driving mode of the touch sensing circuit.

17. The touch sensing method of claim 15 further comprising a digital signal processing circuit's processing a signal received from the analog signal processing circuit, wherein the digital signal processing circuit changes its operation depending on the type of object.

18. The touch sensing method of claim 17, wherein the analog signal processing circuit receives a signal regarding operations of the digital signal processing circuit to change a frequency pass band of the adjustable filter.

19. The touch sensing method of claim 15, wherein the adjustable filter changes the frequency pass band of the touch sensing signal by changing the cut-off frequency.

* * * * *